(12) United States Patent
Mopuru et al.

(10) Patent No.: US 10,528,893 B1
(45) Date of Patent: *Jan. 7, 2020

(54) GENERATING NOTIFICATIONS BASED ON FORMATION OF MEMBERSHIPS

(71) Applicant: Google LLC, Mountain View, CA (US)

(72) Inventors: Sandeep Mopuru, Sunnyvale, CA (US); Zach Yeskel, San Francisco, CA (US); Balaji Srinivasan, Fremont, CA (US); Kavi Harshawat, San Francisco, CA (US); Alison Boncha, San Francisco, CA (US); Yonatan Zunger, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/883,070

(22) Filed: Jan. 29, 2018

Related U.S. Application Data

(63) Continuation of application No. 13/485,814, filed on May 31, 2012, now Pat. No. 9,881,258.

(51) Int. Cl.
G06F 3/00 (2006.01)
G06Q 10/00 (2012.01)

(52) U.S. Cl.
CPC .................. *G06Q 10/00* (2013.01)

(58) Field of Classification Search
CPC .... G06Q 10/00; G06Q 50/01; H04L 12/1813; H04L 12/581; H04L 65/403;
(Continued)

(56) References Cited

U.S. PATENT DOCUMENTS

| 7,117,254 | B2 | 10/2006 | Lunt et al. |
| 8,949,343 | B2 | 2/2015 | Shen et al. |
| 2005/0120090 | A1 | 6/2005 | Kamiya |
| 2006/0031328 | A1 | 2/2006 | Malik |

(Continued)

OTHER PUBLICATIONS

Adam Minic, SEO-Idaho, Website Design, Facebook Tips: How to turn off facebook wall so people can't write on my wall, published Nov. 30, 2011, retrieved from Internet on Sep. 23, 2014 at http://idaho-seo.blogspot.com/2011/11/now-to-turn-offfacebook-wall-so-people.html.

*Primary Examiner* — Shourjo Dasgupta
(74) *Attorney, Agent, or Firm* — Lowenstein Sandler LLP

(57) ABSTRACT

Systems and methods for generating notifications are described. A method includes receiving user input of a user of a first plurality of users of a first service to transmit an invitation to a second plurality of users to become members of the first service, wherein the first plurality of users are associated with respective online accounts of the first plurality of online accounts, the second plurality of users are specified in the user input and are associated with respective online accounts of a second plurality of online accounts of a second service. The method also includes in response to the user input of the user of the first plurality of users of the first service to transmit the invitation to the second plurality of users to become a member of the first service, determining that a set of usage parameters of a subset of the second plurality of online accounts of the second service do not satisfy one or more activity criteria for becoming a member of the first service, preventing transmission of the invitation to become a member of the first service to a subset of users of the second plurality of users of the second service, wherein the subset of users of the second plurality of users of the second service corresponds to the subset of the second plurality of online accounts of the second service that do not satisfy the one or more activity criteria, and sending the invitation to become a member of the first service to (Continued)

remaining users in the second plurality of users. The method further includes in response to one or more users of the remaining users accepting the invitation to become members of the first service, providing a notification data to inform the user that the one or more users of the remaining users have become members of the first service, and in response to a selection of the notification data by the user, providing a user interface presenting customized operations to be performed by the user with respect to each of the one or more users of the remaining users that have become members of the first service.

20 Claims, 16 Drawing Sheets

(58) Field of Classification Search
CPC ....... H04L 67/306; H04L 51/04; H04L 51/32; H04N 7/15; G06F 3/0481
See application file for complete search history.

(56) References Cited

U.S. PATENT DOCUMENTS

| | | |
|---|---|---|
| 2006/0179404 A1 | 8/2006 | Yolleck et al. |
| 2006/0210034 A1 | 9/2006 | Beadle et al. |
| 2007/0121843 A1 | 5/2007 | Atazky et al. |
| 2007/0282955 A1 | 12/2007 | Lin et al. |
| 2009/0119299 A1 | 5/2009 | Rhodes |
| 2009/0192871 A1 | 7/2009 | Deacon et al. |
| 2009/0216836 A1 | 8/2009 | Haynes et al. |
| 2009/0313299 A1 | 12/2009 | Bonev |
| 2009/0319610 A1 | 12/2009 | Nikolayev et al. |
| 2009/0327754 A1 | 12/2009 | Sato |
| 2010/0088381 A1 | 4/2010 | Deslandres |
| 2010/0174747 A1 | 7/2010 | Farrell et al. |
| 2012/0079023 A1 | 3/2012 | Tejada-Gamero et al. |
| 2012/0089686 A1 | 4/2012 | Meister |
| 2012/0290109 A1 | 11/2012 | Engelberg et al. |
| 2012/0311045 A1 | 12/2012 | Sylvain |
| 2012/0316918 A1 | 12/2012 | Kerr et al. |
| 2013/0288759 A1 | 10/2013 | Rom et al. |
| 2014/0304350 A1 | 10/2014 | Rana et al. |

GENERATING NOTIFICATIONS BASED ON FORMATION OF MEMBERSHIPS

RELATED APPLICATIONS

This application is a continuation application of co-pending U.S. patent application Ser. No. 13/485,814, filed on May 31, 2012, entitled, "GENERATING NOTIFICATIONS BASED ON FORMATION OF MEMBERSHIPS," which is herein incorporated by reference.

BACKGROUND

There is a recent advancement of use of computer networks and smart phones for various services, e.g., music, social networks, games, etc. As a network of users that are linked via the computer networks and smart phones increases, there is an increased user interest in involving other users. For example, a user would like to invite his or her friend to play a game, to listen to music, etc. With an increase in a number of users, it is difficult for the user to keep up with various operations that are associated with the invitations.

SUMMARY

The present disclosure relates to systems and methods for generating notifications based on formation of memberships.

Various implementations described in the present disclosure provide systems and methods for generating notifications based on formation of memberships. It should be appreciated that the implementations described in the present disclosure may be implemented in numerous ways, e.g., a process, an apparatus, a system, a device or a method on a computer-readable medium. Various implementations of the present disclosure are described below.

In a variety of implementations, a notification is generated when one or more users become members of a service that is offered via the Web. A user receives the notification and may select the notification to generate a detailed notification. The user may use the detailed notification to share multimedia with another user, welcome another user, block another user, ignore another user, add another user to a social group, etc.

In several implementations, a user grows his/her social graph by inviting other users, such as, for example many of his/her friends, to become members of a social network service that is used by the user. In various implementations, a first user cannot become a member of a social network service that is used by a second user without receiving an invitation from the second user via the social network service. When several other users join a social network of the inviting user, the social graph becomes dense.

In several implementations, a method for generating notifications is described. The method includes identifying a selection to invite users to become members of a social network and generating prompt data to allow invitations to be sent to the users based on the selection. The method further includes determining whether indications of becoming members of the social network are received from one or more of the users. The method includes transmitting notification data to inform a member that the one or more users have become members of the social network in response to determining that the indications of becoming members are received.

In various implementations, the method includes receiving an indication of a selection of the notification data and generating detailed notification data based on the selection of the notification data. The detailed notification data includes interface data that allows in-network communication between members of the social network.

In a number of implementations, the method includes generating the prompt data that includes a field that includes a uniform resource locator (URL) of a webpage. The webpage is used to access the social network.

In several implementations, the method includes generating the prompt data that includes a field. The field includes a URL of a webpage. The method further includes generating detailed notification data based on a selection of the notification data. The detailed notification data includes an identification of a website at which a selection of the URL is made by one of the users.

In a number of implementations, the method includes generating the prompt data that allows reception of electronic message addresses from the member. The method further includes receiving an indication of a selection of a button to send electronic messages to the users having the electronic message addresses.

In various implementations, the method includes generating the prompt data to allow reception of one or more electronic message addresses from the member, determining whether an indication of a selection to send electronic messages to the users having the electronic message addresses is received, determining parameters associated with use of a service upon determining that indication of the selection to send the electronic messages is received, and restricting sending one of the electronic messages to one of the users based on the parameters.

In several implementations, the parameters include usage of posts within a web account of one of the users, a change over time in a social group of the web account of one of the users, one or more keywords within the web account of one of the users, a frequency of use of the web account of one of the users, a frequency of use of the keywords, an amount of delay between sending the electronic messages to the users and receiving the notification data from the users, or a combination thereof.

In a variety of implementations, the method includes determining whether indications including authentication data or profile data associated with the users is received. The authentication data is used to assign web accounts to the users and the profile data is used to identify the users within a computer network.

In a number of implementations, the notification data includes widget data and the widget data includes user data that identifies the users.

In several implementations, the method includes sending the notification data via a network to a client device.

In various implementations, the method includes receiving an indication of a selection of the notification data and generating detailed notification data based on the selection of the notification data. The detailed notification is generated to prompt the member to add the users to a social group that is maintained in the social network that is associated with a web account of the member, greet the users, share multimedia with the users, invite the users to chat within the social network, ignore web messages received from the users, block web messages received from the users, or a combination thereof.

In a variety of implementations, the method includes receiving the user data and an indication of a selection of a sign-in button from a client device via a network. The method further includes identifying that an indication of the selection is received via the network from the client device.

In several implementations, a method for generating notifications is described. The method includes displaying an interface to invite users to become members of a social network, determining whether a selection of the interface is received, displaying a prompt to allow invitations to be sent to the users based on the reception of the selection, determining whether notification data indicating that the users became members of the social network is received, and displaying a notification upon receiving the notification data.

In various implementations, the method includes displaying text input fields to receive electronic message addresses of the users from a member of the social network.

In a number of implementations, the method includes displaying a text input field including a URL of a webpage. The webpage is used to access the social network.

In several implementations, the method includes receiving electronic message addresses of the users from a member of the social network and receiving a selection of a button from the member to send the URL to the electronic message addresses of the users.

In various implementations, the method includes determining whether widget data is received from the server via a network. The widget data includes user data of the users and the user data is assigned to the users to access web accounts of the users.

In a number of implementations, the method includes determining whether an indication of a selection of the notification is received and displaying a detailed notification based on the selection of the notification. The detailed notification prompts a member of the social network to add the users to a social group that is maintained in the social network that is associated with a web account of the member, allows the member to greet the users, allows the member to share multimedia with the users, allows the member to invite the users to chat within the social network, allows the member to ignore web messages received from the users, allows the member to block web messages received from the users, or a combination thereof.

In various implementations, the method includes receiving an indication of a selection of a sign-in button with user data and sending the user data via a network to a server for authentication. The method includes displaying a button that is accessed by a member of the social network via a web account.

In several implementations, a server system for generating notifications is described. The server system includes a memory device configured to store notification data, and one or more processors configured to identify a selection to invite users to become members of a social network. The one or more processors are configured to generate prompt data to allow invitations to be sent to the users based on the selection. The one or more processors are configured to determine whether indications of becoming members of the social network are received from one or more of the users. The one or more processors are configured to transmit the notification data to inform a member that the one or more users have become members of the social network in response to determining that the indications of becoming members are received.

In various implementations, the one or more processors are configured to receiving an indication of a selection of the notification data. The one or more processors are configured to generate detailed notification data based on the selection of the notification data. The detailed notification data includes interface data that allows in-network communication between members of the social network.

These implementations may provide one or more of the following advantages. For example, various implementations of the systems and methods, described herein, provide a notification to a user when other users have joined a service, e.g., a social network service. Also, several implementations of the systems and methods, described herein, reduces chances of a user inciting undesirable users, e.g., spammers, bots, etc., to become members of a service.

Other aspects will become apparent from the following detailed description, taken in conjunction with the accompanying drawings.

BRIEF DESCRIPTION OF THE DRAWINGS

Various implementations of the present disclosure may best be understood by reference to the following description taken in conjunction with the accompanying drawings.

DETAILED DESCRIPTION

The following implementations describe systems and methods for generating notifications based on formation of memberships within a network.

Figure 1:
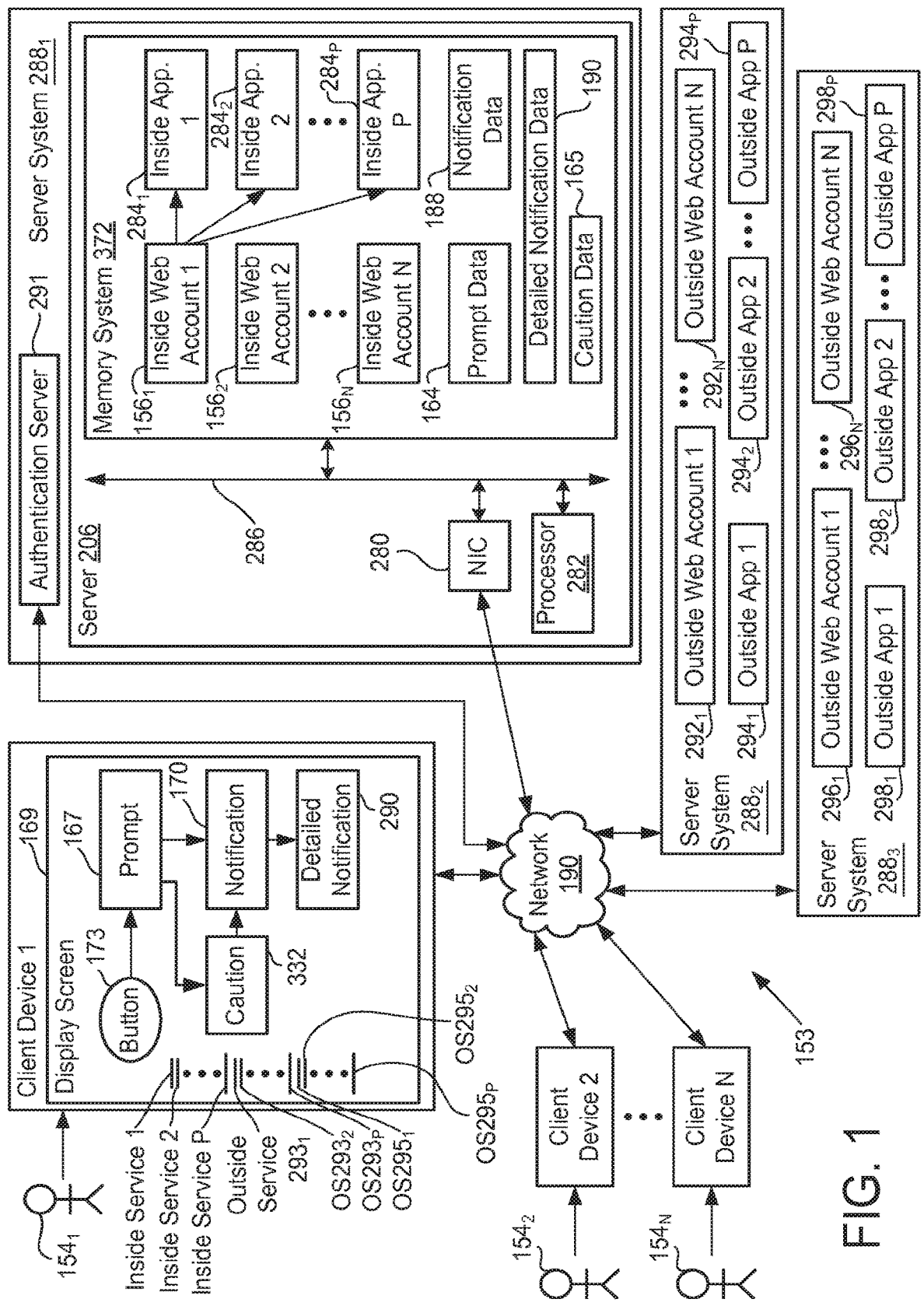
FIG. 1 is a block diagram of a system for generating notifications, in accordance with various implementations of the present disclosure.

FIG. 1 is a block diagram of a system 153 for generating notifications, in accordance with several implementations described in the present disclosure. A user $154_1$ uses a client device 1 to access one or more inside services 1 thru P, where P is an integer greater than zero. For example, a user provides login information that identifies the user to receive access to one or more of the inside services 1 thru P. Examples of a client device include a tablet, a desktop computer, a laptop computer, a cell phone, a smart phone, and a personal digital assistant.

The login information identifies a user to an authentication server 291 of a server system $288_1$. As used herein, a server includes a physical machine or a virtual machine. The server system $288_1$ includes one or more servers, e.g., a server 206. The login information includes user data, e.g., a username of a user, a password of a user, a telephone number of a user, an email address of a user, or a combination thereof. The login information is provided via an input device of the client device 1. Examples of an input device include a keyboard, a mouse, a touchpad, a stylus, and a display screen.

A service is accessed at a website of the World Wide Web. Examples of services include a music service, an email service, a social network service, a calendar service, a document storage service, a document creation service, a photo storage service, a news service, a maps service, a translation service, a telecommunications service, a search service, and a video storage service.

In several implementations, the music service is provided by a server to allow a user to upload music to the server via a website and/or to download music from the server via the website. In a number of implementations, the email service allows a user to send and/or receive electronic mails from other users via a website. In various implementations, multimedia is embedded within an email. Examples of multimedia include an image, text, audio, video, and a combination thereof.

In several implementations, a social network service provides features via a web browser to allow users to stay in touch with each other. For example, a social network service provides a website for a user to post multimedia, receive multimedia from another user, share information with other users, chat with other users, search for other users, chat with users, and/or categorize users as family, friends, acquaintances, etc. In various implementations, the calendar service allows a user to maintain a schedule of things to do, e.g., appointments, via an online calendar.

Additionally, in some implementations, the document creation service allows a user to create via a website a formatted document, e.g., a spreadsheet and a word processing document. Also, in some implementations, the document storage service allows a user to store a document on a server.

Moreover, in several implementations, the photo storage service allows a user to store, access, view and/or share images via a website on a server. An image is shared with other users. For example, when a share icon within a photo storage service is selected by a user via an input device of a client device, another user may view on a website one or more photos that are shared. Furthermore, in some implementations, the news service provides access to news, e.g., world news, finance news, entertainment news, weather news, local community news, etc., via a website.

Also, in several implementations, the maps service provides access to a user to directions from a start address to a destination address, a satellite view of a geographical area, and/or to places of interest to a user. Moreover, in a variety of implementations, the translation service provides access to a user to translation of a web page from one language to another language.

In a number of implementations, the telecommunications service is provided when a web-based application is executed for communicating voice between a computer and a phone or between a computer and another computer. In several implementations, the telecommunications service is offered with other client services, e.g., a voicemail service, a texting service, a call history service, a conference calling service, a call screening service, and/or a blocking of unwanted calls service.

Moreover, in some implementations, a server that provides the search service receives a search query from a user via a web browser, searches one or more databases, and provides results of the search via the web browser to the user. In various implementations, a server that provides the video storage service allows a user to upload videos to the server via a client device and to view the uploaded videos via the client device.

It should be noted that services are not limited to the ones described herein. For example, various other services include a legal search service, a shopping service, and financial services.

The inside services 1 thru P are provided by one entity or one person. For example, the entity or person that provides the inside services 1 thru P is responsible for updating data that is rendered to provide the services 1 thru P, for obtaining data to provide the inside services 1 thru P, for ensuring that the data complies with laws of a geographical region having users that receive the services 1 thru P, for deleting the data, or a combination thereof. In several implementations, the inside services 1 thru P is provided by more than one entity that is controlled by a parent entity or by more than one person who are controlled by a single person. Examples of an entity include a corporation and a partnership.

The inside service 1 is provided when a processor 282 of the server 206 executes an inside application $284_1$. A processor, as used herein, includes an application specific integrated circuit (ASIC), a field programmable gate array (FPGA), a microprocessor, a controller, a processing unit, or a central processing unit (CPU). Similarly, the inside service 2 is provided when the processor 282 executes an inside application $284_2$ and so on until the inside service P is provided when the processor 282 executes an inside application $284_P$.

Upon receiving with the login information an indication of a selection of a sign-in button that is displayed on the client device 1, the client device 1 sends the user data via a network 190 to the authentication server 291. A graphical processing unit (GPU) of the client device 1 renders the user data to display the login information. Examples of the network 190 include a wired network, a combination of a wireless network and a wired network, a local area network (LAN), a wide area network (WAN), a combination of WAN and a LAN, the Internet, an Intranet, and a combination of the Internet and an Intranet.

When the user data is authenticated by the authentication server 291, an indication of the authentication is sent by the authentication server 291 via the network 190 to the client device 1. When the indication of the authentication is received, the user $154_1$ logs into an inside web account $156_1$ and achieves access to one or more of the inside services 1 thru P.

Inside web accounts $156_1$ thru $156_N$ are maintained by the server 206. In various implementations, more than one server of the server system $288_1$ maintains the inside web accounts $156_1$ thru $156_N$.

The inside web accounts 1 thru N are located within in a memory system 372 that includes one or more memory devices. A memory device includes a read-only memory (ROM), a random access memory (RAM), or a combination thereof. A memory device is an example of a computer-readable medium. Examples of a memory device include a flash memory and a hard disk.

The inside web account $156_1$ is assigned by the server system $288_1$ to the user $154_1$, the inside web account $156_2$ is assigned by the server system $288_1$ to the user $154_2$, and so on until the inside web account $156_N$ is assigned by the server system $288_1$ to the user $154_N$. For example, when authentication information is received from the user $154_1$ by the server system $288_1$ via the network 190, the server system $288_1$ assigns the inside web account $156_1$ to the user $154_1$. The user $154_1$ operates the client device 1 to provide the authentication information. The authentication information is used to authenticate the login information that is provided by the user $154_1$ during an attempt to log into the inside web account $156_1$. Examples of the authentication information that is used to authenticate a user include a username provided by the user via a client device, a password that is provided by the user via the client device, an answer provided by the user to a question via the client device, an email address that is provided by the user via the client device, etc.

When the users 154 are logged into their respective web accounts 156, the users 154 may use a social network service that allows one or more of users 154 to share multimedia with each other, to post the multimedia into their respective web accounts, and/or to receive the multimedia from the remaining of users 154. In several implementations, when the users 154 use a social network service, a social network is formed between the users 154.

The system 153 further includes a server system $288_2$. The server system $288_2$ includes a memory system (not shown) that includes one or more memory devices (not shown). The one or more memory devices of the server system $288_2$ includes outside web accounts 292 and outside applications 294. The outside web accounts 292 are assigned to the users 154 in a manner similar to that in which the inside web accounts 156 are assigned. For example, the outside web account 2921 is assigned to the user $154_1$ based on the authentication information. As another example, the outside web accounts $292_2$ is assigned to the user $154_2$ based on the authentication information. One or more processors (not shown) of the server system $288_2$ execute the applications 294 to provide outside services 293 at a client device.

The outside services 293 are provided by one entity or one person. In several implementations, the outside services 293 are provided by more than one entity that is controlled by a parent entity or by more than one person who are controlled by a single person. If one or more entities provide the outside services 293, the one or more entities are different than one or more entities that provide the inside services 1 thru P. Similarly, if one or more person provide provides the outside services 293, the one or more person are different than one or more person that provide the inside services 1 thru P. The user $154_N$ logs into the outside web account $292_N$ to access one or more of the outside services 293.

Moreover, the system 153 includes a server system $288_3$. The server system $288_3$ includes a memory system (not shown) that includes one or more memory devices (not shown). The one or more memory devices of the server system $288_3$ includes outside web accounts 296 and outside applications 298. The outside web accounts 296 are assigned to the users 154 in a manner similar to that in which the inside web accounts 156 are assigned. One or more processors (not shown) of the server system $288_3$ execute the outside applications 296 to provide the outside services 295 at a client device.

The outside services 295 are provided by one entity or one person. In several implementations, the outside services 295 are provided by more than one entity that is controlled by a parent entity or by more than one person who are controlled by a single person. If one or more entities provide the outside services 295, the one or more entities are different than one or more entities that provide the inside services 1 thru P and are different than one or more entities that provide the outside services 293. Similarly, if one or more person provide the outside services 295, the one or more person are different than one or more person that provide the inside services 1 thru P and are different than one or more person that provide the outside services 293. The user $154_N$ logs into the outside web account $296_N$ to access one or more of the outside services 295.

The user $154_1$ logs into the inside web account $156_1$ to access the inside service 2. Upon accessing the inside service 2, a graphical processing unit (GPU) of the client device 1 displays a button 173 within the inside service 2. When the button 173 is selected by the user $154_1$ via the input device of the client device 1, the processor 282 of the server 206 generates and sends prompt data 164 via the network 190 to the client device 1. The prompt data 164 allows the user $154_1$ to invite the remaining users $154_2$ thru $154_N$ to become members of the inside service 2.

Upon receiving the prompt data 164, the GPU of the client device 1 renders the prompt data 164 to display a prompt 167 on a display screen 169 of the client device 1. Examples of a display screen include a liquid crystal display screen (LCD), a light emitting diode (LED) display screen, a cathode ray tube (CRT) display screen, and a plasma display screen.

In several implementations, the user $154_1$ provides one or more electronic messages addresses of the remaining users $154_2$ thru $154_N$ to a field within the prompt 167 via the input device of the client device 1. An example of an electronic message address includes an email address.

The electronic message addresses of the remaining users $154_2$ thru $154_N$ are associated with the inside service 1, the outside service $293_1$, or the outside service $295_1$. For example, an electronic message address of the user $154_2$ that is associated with the outside service $293_1$ identifies the outside web account $292_2$ that is assigned to the user $154_2$. As another example, an electronic message address of the user $154_N$ that is associated with the outside service $295_1$ identifies the outside web account $296_N$ that is assigned to the user $154_N$.

In various implementations, the prompt 167 includes a field that includes a uniform resource locator (URL) of a web page. The user $154_1$ copies the URL that provides access the inside service 2.

In a number of implementations, the prompt 167 includes both fields including one that receives the electronic message addresses from the user $154_1$ and one that provides the URL.

When the user $154_1$ selects a button to send the invitations to the remaining users $154_2$ thru $154_N$ after providing the electronic message addresses of the remaining users $154_2$ thru $154_N$, a network interface controller (NIC) 280 of the server 206 sends the URL to the electronic message addresses of the remaining users $154_2$ thru $154_N$. For example, the NIC 280 sends the URL to outside web account $292_2$ of the remaining user $154_2$. As another example, the NIC 280 sends the URL to the outside web account $296_N$ of the remaining user $154_N$. In several implementations, the URL is sent by the NIC 280 to electronic message addresses of the remaining users $154_2$ thru $154_N$ periodically, e.g., hourly, daily, weekly, or monthly.

In several implementations, the user $154_1$ pastes the URL during use of one or more of the inside services 1, 3 thru P, one or more of the outside services $293_1$ thru $293_P$, one or more of the outside services $295_1$ thru $295_P$, or a combination thereof. For example, the user $154_1$ uses the input device of the client device 1 to paste the URL within a text chat window while chatting with the user $154_2$ via the outside service $293_3$. As another example, the user $154_1$ uses the input device of the client device 1 to paste the URL within a post of the outside service $295p$, which, for example, is a social network service.

In various implementations, when the user $154_1$ selects a button to send the invitations to the remaining users $154_2$ thru $154_N$ after providing the electronic message addresses of the remaining users $154_2$ thru $154_N$, the processor 282 generates caution data 165, which cautions the user $154_1$ that some of the electronic message addresses are those of undesirable persons or entities, e.g., spammers and bots. The NIC 280 sends the caution data 165 via the network 190 to a NIC of the client device 1. The GPU of the client device 1 renders the caution data 165 to display a caution 332 on the display screen 169.

The remaining users $154_2$ thru $154_N$ accept the invitations to become members of the inside service 2. When the remaining users $154_2$ thru $154_N$ accept the invitations to become members, the processor 282 generates notification data 188 to notify the user $154_1$ of the acceptance of the invitations. The notification data 188 is located within the inside web account $156_1$ of the user $154_1$ and is sent by the NIC 280 via the network 190 client device 1. When the user $154_1$ accesses the inside web account $156_1$ via the client device 1, the GPU of the client device 1 renders the notification data 188 to display a notification 170 on the display screen 169. The notification 170 provides a message to the user $154_1$ that the remaining users $154_2$ thru $154_N$ have become members of the inside service 2.

In several implementations, if the remaining users $154_2$ thru $154_N$ reject the invitations to become members, the notification 170 provides a message to the user $154_1$ that the remaining users $154_2$ thru $154_N$ have declined to accept the invitations for membership of the inside service 2. In other implementations, if the remaining users $154_2$ thru $154_N$ reject the invitations to become members, the processor 282 does not generate the notification data 188 and the notification 170 is not displayed on the display screen 169 by the GPU of the client device 1.

When the user $154_1$ selects the notification 170 via the input device of the client device 1, the processor 282 of the server 206 generates detailed notification data 190 and the NIC 280 sends the detailed notification data 190 via the network 190 to the client device 1. In several implementations, the detailed notification data 190 includes button data that allows the user $154_1$ to receive multimedia updates from the remaining users $154_2$ thru $154_N$ via the inside service 2, button data that allows the user $154_1$ to video chat with the remaining users $154_2$ thru $154_N$ via the inside service 2, button data that allows the user 1541 to welcome the remaining users $154_2$ thru $154_N$ to the inside service 2 via the inside service 2, button data that allows the user $154_1$ to block communication of multimedia with the remaining users $154_2$ thru $154_N$ via the inside service 2, button data that allows the user $154_1$ to ignore multimedia received from the remaining users $154_2$ thru $154_N$ via the inside service 2, or a combination thereof. The GPU of the client device 1 renders the detailed notification data 190 to display a detailed notification 290 on the display screen 169.

It should be noted that in several implementations, any communication, e.g., reception and sending, of data that is described herein as being performed by a server is performed by a NIC of the server. Moreover, in a variety of implementations, any function other than communication that is described herein as being performed by a server is performed by one or more processors of the server. Also, although several functions are described herein as being performed by the server 206, in various implementations, the functions are performed by one or more servers of the server system $288_1$.

Figure 2:
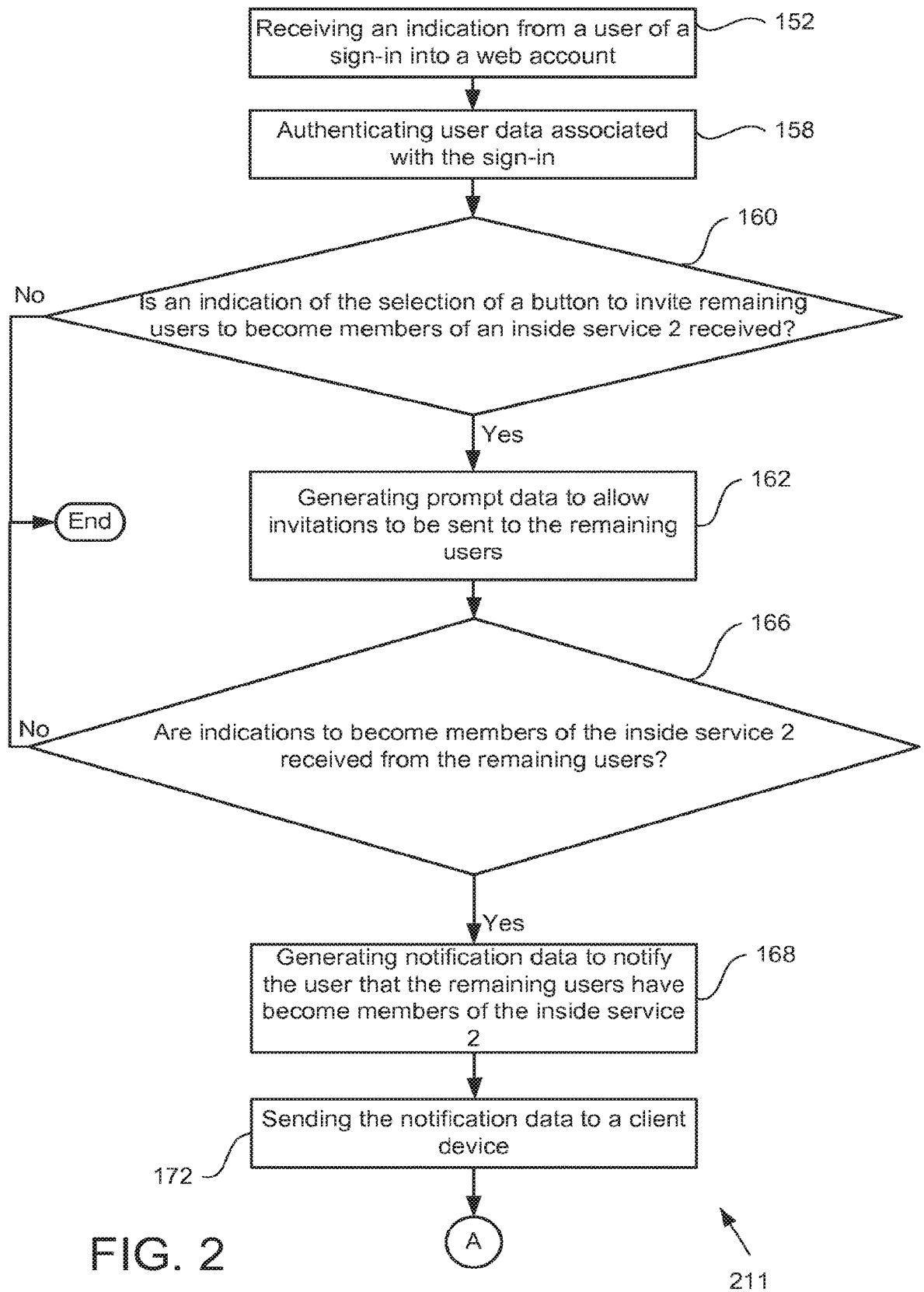
FIG. 2 is a flowchart of a method for generating detailed notification data, in accordance with several implementations of the present disclosure.

FIG. 2 is a flowchart of a method 211 for generating detailed notification data, in accordance with several implementations of the present disclosure. The method 211 is executed by one or more processors of one or more servers of the server system $288_1$ (FIG. 1). In an operation 152, an indication from the user $154_1$ (FIG. 1) of a sign-in into the inside web account $156_1$ (FIG. 1) is received. For example, the user data and a signal indicating a selection of the sign-in button are received by the NIC 280 from the client device 1 via the network 190 (FIG. 1).

Upon receiving the indication of the sign-in into the inside web account $156_1$, in an operation 158, the user data is authenticated by the authentication server 291 (FIG. 1). For example, the authentication server 291 determines that a username and a password received from the client device $154_1$ via the network 190 are valid. To illustrate, the authentication server 291 compares the user data received from the client device $154_1$ with authentication data that is pre-stored in the memory system 372 (FIG. 1). The authentication data is rendered by the GPU of the client device $154_1$ to display the authentication information. Upon determining that a match exists between the user data that is received from the client device $154_1$ and the authentication data, the authentication server 291 determines that the received user data is authentic. On the other hand, upon determining that there is a lack of existence of the match, the authentication server 291 determines that the received user data is unauthentic. An indication of the authentication of the received user data is sent via the network 190 to the client device 1.

In an operation 160, it is determined whether an indication of a selection of the button 173 (FIG. 1) to invite the users $154_2$ thru $154_N$ to become members of the inside service 2 is received from the client device 1 via the network 190. Upon receiving an indication, e.g., a signal, of the selection of the button 173, the client device $154_1$ sends the indication via the network 190 to the server 206. When the indication of the selection of the button 173 is received via the network 190, the server 206 determines that the indication is received. On the other hand, when the indication of the selection of the button 173 is not received, the server 206 determines that the indication is not received.

In various implementations, the indication of the selection of the button 173 is not received when the button 173 is not selected by the user $154_1$, when the client device 1 does not send the indication of the selection of the button 173, the network 190 does not convey the indication of the selection of the button 173, or a combination thereof. Upon determining that the indication of the selection of the button 173 is not received, the method 211 ends.

On the other hand, upon determining that the indication of the selection of the button 173 is received, in an operation 162, the prompt data 164 (FIG. 1) that allows invitations to use the inside service 2 to be sent by the user $154_1$ to the remaining users $154_2$ thru $154_N$ is generated. The prompt data 164 is generated based on the indication of the selection of the button 173, e.g., when the indication of the selection of the button 173 is received by the processor 282 of the server 206.

The remaining users $154_2$ thru $154_N$ are non-members of the inside service 2 at a time the prompt data 164 is generated. For example, the processor 282 of the server 206 determines that the users $154_2$ thru $154_N$ have not used the inside service 2 after logging into the respective inside web accounts $156_2$ thru $156_N$. In this example, the users $154_2$ thru $154_N$ may have used the remaining inside services 1 and/or 3 thru P after logging into their respective web accounts $156_2$ thru $156_N$. To illustrate non-use of the inside service 2 after logging into their respective web accounts $156_2$ thru $156_N$, the users $154_2$ thru $154_N$ have not provided any profile information to the server 206, have not used the inside service 2 to post multimedia within the via the inside web accounts $156_2$ thru $156_N$, or a combination thereof. Examples of the profile information include a name of a user, a photo of the user, a user name of the user, an electronic message address of the user, a telephone number of the user, or a combination thereof.

As another example, the processor 282 of the server 206 determines that the users $154_2$ thru $154_N$ have not used any of the inside services 1 thru P and are not assigned the inside web accounts $156_2$ thru $156_N$. In this example, the processor 282 determines that the users $154_2$ thru $154_N$ have used the respective outside web accounts $292_2$ thru $292_N$, the respective outside web accounts $296_2$ thru $296_N$, or a combination thereof, and determines that the user $154_1$ have communicated with the remaining users $154_2$ thru $154_N$ using the inside web account $156_1$ of the user $154_1$ and web accounts, such as for example, outside web accounts $292_1$ thru $292_N$, outside web accounts $296_2$ thru $296_N$, or a combination thereof, of the remaining users $154_2$ thru $154_N$.

In several implementations, the prompt data 164 includes URL data, electronic message address data of the remaining users $154_2$ thru $154_N$, or a combination thereof. The electronic message address data is rendered by a GPU of a client device to display one or more electronic message addresses and the URL data is rendered by a GPU of a client device to display the URL. The electronic message addresses identified in the prompt data 164 includes electronic message addresses of the remaining users $154_2$ thru $154_N$ assigned by the server system $288_2$ to provide the outside service $293_1$, electronic messages of the remaining users $154_2$ thru $154_N$ assigned by the server system $288_3$ to provide the outside service $295_1$, electronic message addresses of the remaining users $154_2$ thru $154_N$ assigned by the server 206 to provide the inside service 1, or a combination thereof.

The URL data includes data that identifies a web site that is used to access the inside service 2. For example, the URL data includes data that identifies a web site that is used to access a social network service. As another example, the URL data identifies the URL of a login web page that includes a request for the authentication information from one of the remaining users $154_2$ thru $154_N$. In this example, the processor 282 of the server 206 provides access to one or more of inside services 1 thru N when the authentication server 291 authenticates the user data that is received via the login web page from the one of the remaining users $154_2$ thru $154_N$. As another example, the URL data identifies the URL of a profile web page that includes a request for the profile information from one of the remaining users $154_2$ thru $154_N$. In this example, the NIC 280 of the server 206 sends profile web page data to a client device that the one of the remaining users $154_2$ thru $154_N$ operates and the profile web page data is rendered by a GPU of the client device to display within the inside service 2.

In various implementations, the user $154_1$ uses the client device $154_1$ to copy the URL and to paste the URL into one or more of the outside services 293, one or more of the outside services 295, or a combination thereof. As an example, the user $154_1$ copies and pastes the URL into a chat service that the user $154_1$ uses to chat with one or more of the remaining users $154_2$ thru $154_N$. In this example, the chat service is an example of one of the inside services 1 thru P, one of the outside services 293, and one of the outside services 295. Examples of a chat service include a combination of a video chat service and a text chat service, a text chat service, and a combination of a voice chat service and a text chat service. As another example, the user $154_1$ copies and pastes the URL into an electronic message service that the user $154_1$ uses to communicate electronic messages with one or more of the remaining users $154_2$ thru $154_N$. In this example, the electronic message service is an example of one of the inside services 1 thru P, one of the outside services 293, or one of the outside services 295.

In several implementations, the user $154_1$ selects a button, which is described below in FIG. 7, on the client device 1 and upon receiving an indication of the selection from the client device $154_1$ via the network 190, the NIC 280 of the server 206 sends invitation data to the electronic message addresses of the remaining users $155_2$ thru $154_N$ identified within the prompt data 164. The invitation data includes information regarding how to access the inside service 2. For example, the invitation data includes the URL of the profile web page or the login web page.

The invitation data is received within the outside web accounts $292_2$ thru $292_N$ that are associated with electronic message addresses of the remaining users $154_2$ thru $154_N$ and/or within outside web accounts $296_2$ thru $296_N$ that are associated with electronic message addresses of the remaining users $154_2$ thru $154_N$. When the remaining users $154_2$ thru $154_N$ access the outside web accounts $292_2$ thru $292_N$ and/or $296_2$ thru $296_N$, the server 206 sends the invitation data via the network 190 to the client devices 2 thru N that are used by the remaining users $154_2$ thru $154_N$ to access the outside web accounts $292_2$ thru $292_N$ and/or $296_2$ thru $296_N$. The invitation data is rendered by the GPUs of the client devices 2 thru N to display the invitations on display screens of the client devices 2 thru N.

The remaining users $154_2$ thru $154_N$ view the invitations and may decide to accept the invitations to use the inside service 2. For example, the remaining users $154_2$ thru $154_N$ select the URL that is received within the electronic messages. As another example, the remaining users $154_2$ thru $154_N$ select the URL that is received within a chat room. As yet another example, the remaining users $154_2$ thru $154_N$ select the URL that is received within a post of outside service $293_P$ or of outside service $295_P$. When the URL is selected, the client devices 2 thru N send indications of the selection to the NIC 280 via the network 190.

In response to receiving the indications from the client devices 2 thru N that the URLs are selected, the NIC 280 sends web page data of a web page, e.g., the profile web page or the login web page, to the client devices 2 thru N. The client devices 2 thru N render the web page data to display a web page on the client devices 2 thru N.

In several implementations, the client devices 2 thru N receive the authentication information from the users $154_2$ thru $154_N$ via the web page and send the authentication information via the network 190 to the NIC 280. In response to receiving the authentication information from the NIC 280, the processor 282 assigns the inside web accounts $156_2$ thru $156_N$ to the users $154_2$ thru $154_N$. When the inside web accounts $156_2$ thru $156_N$ are assigned to the users $154_2$ thru $154_N$, the remaining users $154_2$ thru $154_N$ become members of the inside service 2.

In various implementations, instead of receiving the authentication information via the web page, the client devices 2 thru N receive the profile information from the users $154_2$ thru $154_N$ via the web page and send the profile information via the network 190 to the NIC 280. In response to receiving the profile information from the NIC 280, the processor 282 designates the users $154_2$ thru $154_N$ as members of the inside service 2.

In an operation 166, it is determined whether indications of becoming members of the inside service 2 are received from the remaining users $154_2$ thru $154_N$. The authentication information and the profile information that are received from the client devices 2 thru N via the network 190 after the remaining users $154_2$ thru $154_N$ select the URL are examples of the indications of becoming members of the inside service 2.

Upon determining that indications of becoming members of the inside service 2 are received from the remaining users $154_2$ thru $154_N$, the method 211 ends. On the other hand, in response to determining that the indications of becoming members of the inside service 2 are received from the remaining users $154_2$ thru $154_N$, in an operation 168, the notification data 188 (FIG. 1) is generated to store in the inside web account 1. As another example, the notification data 188 includes widget data that includes the user data of the remaining users $154_2$ thru $154_N$.

Moreover, in an operation 172, the notification data 188 is sent to the client device 1 to notify the user $154_1$ that the remaining users $154_2$ thru $154_N$ have become members of the inside service 2. For example, the NIC 280 sends the notification data 188 via the network 190 to the client device 1. The client device 1 renders the notification data 188 to display the notification 170 on the display screen 169 (FIG. 1) of the client device 1. The notification 170 is displayed when the user $154_1$ accesses the inside web account 1 via the client device 1.

In several implementations, the notification 170 includes the user data and information indicating that the remaining users $154_2$ thru $154_N$ have become members of the inside service 2. For example, the notification 170 includes that the remaining users $154_2$ thru $154_N$ have become members of the inside service 2. As another example, the notification 170 includes the user data of the remaining users $154_2$ thru $154_N$ that have become members of the inside service. In this example, the user data is assigned by a service that is used to receive the URL data. To illustrate, when the URL data is sent to an electronic message address of the user $154_2$ via the outside service $293_1$, a username of the user $154_2$ is assigned by the server system $288_2$ that executes the outside application $294_1$. As another illustration, when the URL data is sent to the user $154_N$ via the outside service $295_P$, e.g., a chat service or a social network service, a username is assigned to the user $154_N$ by the server system $288_3$ that executes the outside application $298_P$.

Figure 3:
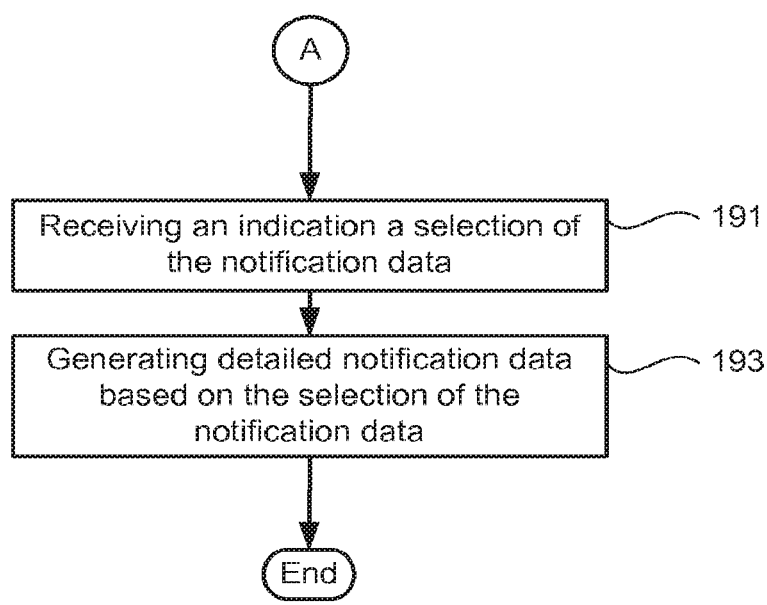
FIG. 3 is a continuation of the flowchart of FIG. 2, in accordance with various implementations of the present disclosure.

FIG. 3 is a continuation of the flowchart of FIG. 2. In an operation 191, an indication of a selection of the notification data 188 (FIG. 1) is received. For example, the processor 282 receives the indication of the selection of the notification data 188 from the NIC 280. The NIC 280 receives the indication of the selection of the notification data 188 via the network 190 from the client device 1. The indication of the selection of the notification data 188 is generated when the user $154_1$ makes a selection of the notification 170 via the input device of the client device 1.

In an operation 193, the detailed notification data 194 (FIG. 1) is generated based on the selection of the notification data 188. For example, the detailed notification data 194 includes interface data that allows in-network communication between members of the social network. In this example, the detailed notification data 194 includes data that when selected by the remaining users $154_2$ thru $154_N$ allows the inside web account 1 of the user $154_1$ to receive posts that are posted within the remaining web accounts $154_2$ thru $154_N$. Moreover, in this example, the detailed notification data 194 includes data that when selected by the remaining users $154_2$ thru $154_N$ allows the inside web account $156_1$ of the user $154_1$ to follow multimedia posted in the remaining web accounts $154_2$ thru $154_N$ and/or share multimedia with the remaining web accounts $154_2$ thru $154_N$ (FIG. 1).

As another example, the detailed notification data 194 includes data that when selected by the user $154_1$, allows the NIC 280 to send a welcome message to one or more of the inside web accounts $156_2$ thru $154_N$ of the remaining users $154_2$ thru $154_N$. The NIC 280 sends the welcome message to one or more of the inside web accounts $156_2$ thru $156_N$ of the remaining users $154_2$ thru $154_N$ whose user data is selected by the user $154_1$ via the input device of the client device 1. As yet another example, the detailed notification data 194 includes data that when selected by the user $154_1$, provides an indication to the server 206 to block or ignore communication of multimedia with one or more of the remaining users $154_2$ thru $154_N$. As still another example, the detailed notification data 194 includes data that when selected by the user $154_1$, provides an indication to the server 206 to allow the user $154_1$ to chat with one or more of the remaining users $154_2$ thru $154_N$. Examples of a chat include a video chat, a voice chat, a text chat, or a combination thereof. The method 211 ends after the operation 193.

It should be noted that the operations described herein are being performed by the server system 122 are performed by one or more processors or one or more servers of the server system 122. Moreover, in various implementations, authentication of login information is performed by any of servers that provide the inside services 1 thru P. Also, in several implementations, the inside services 1 thru P are provided by one or more servers of the server system 122.

Figure 4:
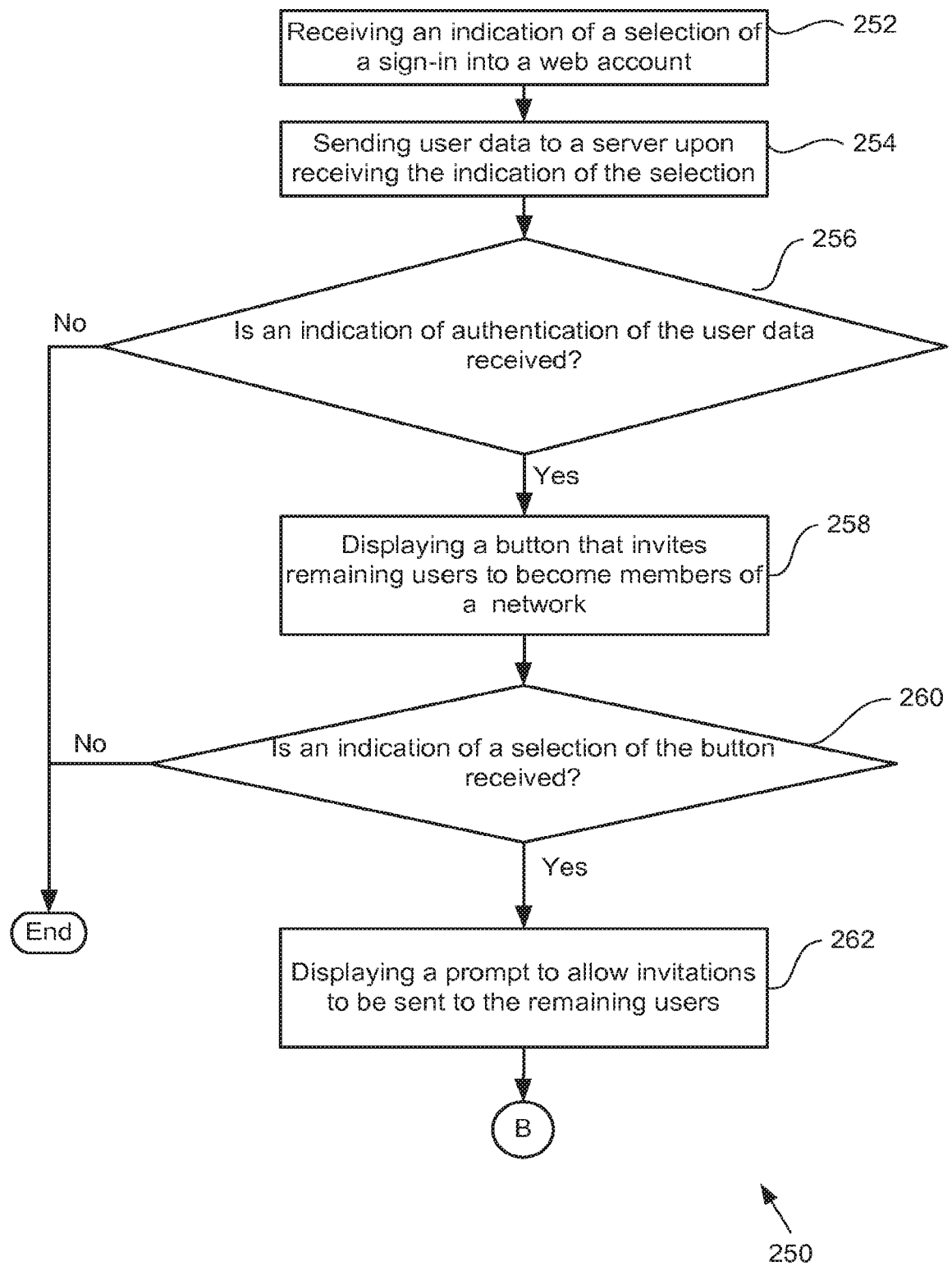
FIG. 4 is a flowchart of a method for displaying a detailed notification, in accordance with several implementations of the present disclosure.

FIG. 4 is a flowchart of a method 250 for displaying the detailed notification 290 (FIG. 1). The method 250 is executed by one or more processors of the client device 1 (FIG. 1). In an operation 252, an indication from the user $154_1$ (FIG. 1) of a sign-in into the inside web account $156_1$ (FIG. 1) is received. For example, a signal indicating a selection by the user 154₁ of the sign-in button and provision by the user 154₁ of the user data are received by a processor of the client device 154₁.

Upon receiving the indication of the selection of the sign-in into the inside web account 156₁, in an operation 254, the user data is sent via the network 190 to the server system 288₁ for authentication by the authentication server 291 (FIG. 1). Moreover, in an operation 256, it is determined whether an indication of authentication of the user data is received from the authentication server 291 via the network 190 (FIG. 1). In response to determining that the indication of authentication of the user data is not received, the method 250 ends.

On the other hand, in response to determining that the indication of authentication of the user data is received, in an operation, 258, the button 173 (FIG. 1) that is used to invite the remaining users 154₂ thru 154ₙ to become members of the inside service 2 is displayed. For example, the GPU of the client device 1 displays the button 173 to invite the remaining users 154₂ thru 154ₙ to become members of a social network service. As another example, the GPU of the client device 1 displays the button 173 for inviting the remaining users 154₂ thru 154ₙ to a social network service that is accessed using the inside web account 156₁.

Upon displaying the button 173 for inviting the remaining users 254₂ thru 254ₙ to become members of the inside service 2, in an operation 260, a determination is made whether an indication of a selection of the button 173 is received. For example, it is determined that the indication of the selection of the button 173 is received when the user 254₁ selects the button 173 via the input device of the client device 1. On the other hand, it is determined that the indication of the selection of the button 173 is not received when the user 254₁ does not select the button 173.

In response to determining that the indication of the selection of the button 173 for inviting the remaining users 254₂ thru 254ₙ is not received, the method 250 ends. On the other hand, upon determining that the indication of the selection of the button 173 for inviting the remaining user 254₂ thru 254ₙ is received, the indication is sent via the network 190 to the NIC 280 (FIG. 1). The processor 282 generates the prompt data 164 in response to the reception of the indication of the selection of the button 173 and the NIC 280 sends the prompt data 164 via the network 190 to the NIC of the client device 1.

In an operation 262, the GPU of the client device 1 renders the prompt data 164 to display the prompt 167 (FIG. 1) on the display screen 169 of the client device 1. The prompt 167 is displayed to allow invitations to be sent to the remaining users 254₂ thru 254ₙ.

In several implementations, the user 154₁ provides via the input device of the client device 1 the electronic message addresses of the remaining users 154₂ thru 154ₙ to send invitations to the remaining users 254₂ thru 254ₙ to become members of the inside service 2. The electronic message addresses of the remaining users 154₂ thru 154ₙ are provided within one of more fields of the prompt 167. In various implementations, the user 154₁ copies from the prompt 167 via the input device of the client device 1 the URL that is displayed within the prompt 167.

In a number of implementations, the remaining users 254₂ thru 254ₙ are non-members of the inside service 2 at a time the prompt 167 is displayed. For example, the remaining users 254₂ thru 254ₙ are non-members of the social network at the time the prompt 167 is displayed.

Figure 5:
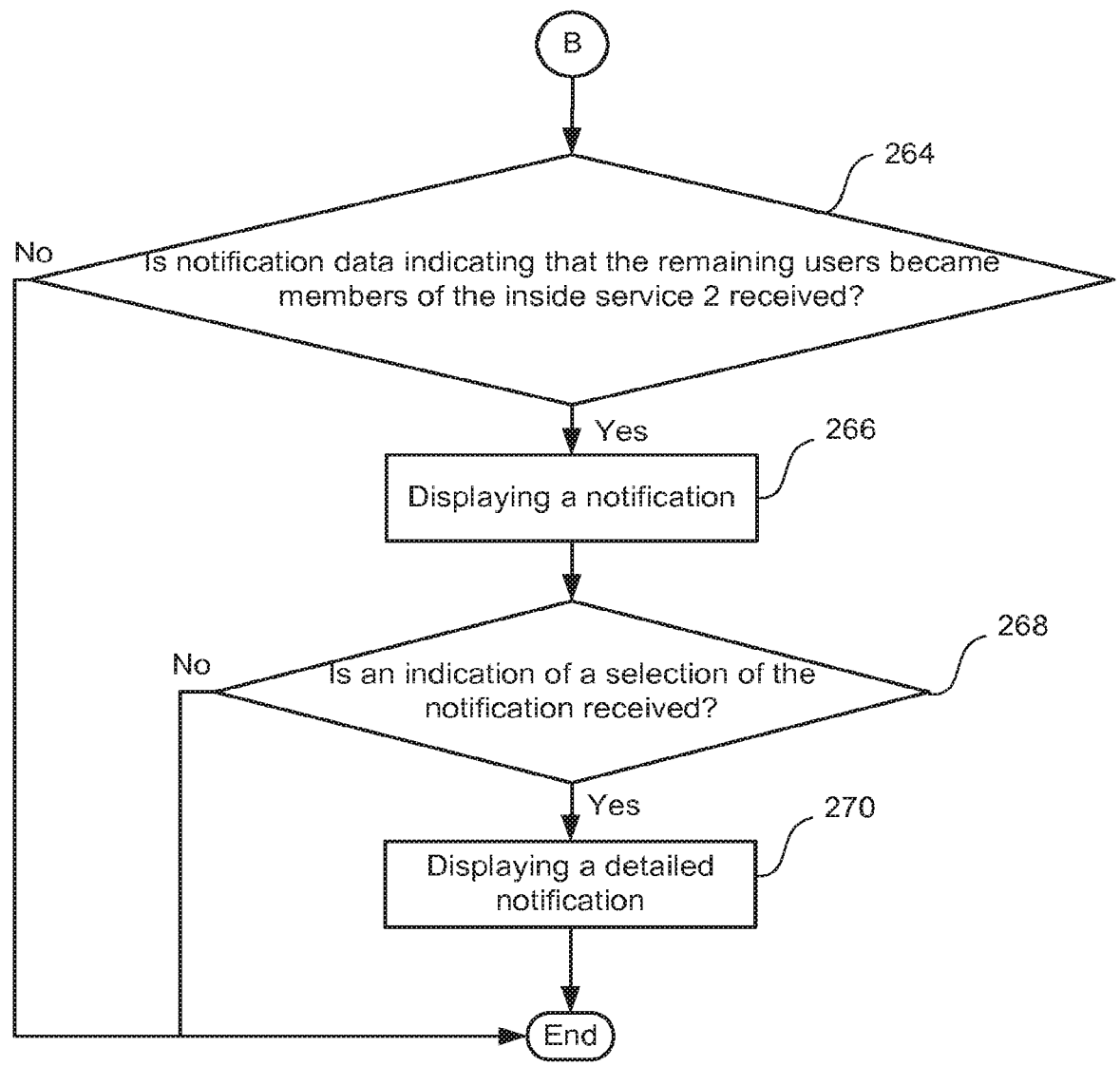
FIG. 5 is a continuation of the flowchart of FIG. 4, in accordance with various implementations of the disclosure.

FIG. 5 is a continuation of the flowchart of FIG. 4. With reference to FIG. 5, in an operation 264, a determination is made whether the notification data 188 indicating that the remaining users 154₂ thru 154ₙ became members of the inside service 2 is received. For example, it is determined whether the notification data 188 indicating that the remaining users 154₂ thru 154ₙ became members of the social network is received from the NIC 280 via the network 190.

Upon determining that the notification data 188 is not received, the method 250 ends. On the other hand, upon determining that the notification data 188 is received, in an operation 266, the GPU of the client device 1 displays the notification 170 (FIG. 1) on the display screen 169 (FIG. 1).

In an operation 268, it is determined whether a selection of the notification 170 is received from the user 154₁ via the input device of the client device 1. Upon determining that the selection of the notification 170 is not received, the method 250 ends.

On the other hand, upon determining that the selection of the notification 170 is received, an indication of the selection of the notification 170 is sent to the NIC 280 via the network 190. The processor 282 generates the detailed notification data 190 in response to receiving the indication of the selection of the notification 170. The NIC 280 sends the detailed notification data 190 via the network 190 to a NIC of the client device 1. In an operation 270, the GPU of the client device 1 renders the detailed notification data 190 to display the detailed notification 290 on the display screen 169. The method 250 ends after the operation 270.

Figure 6:
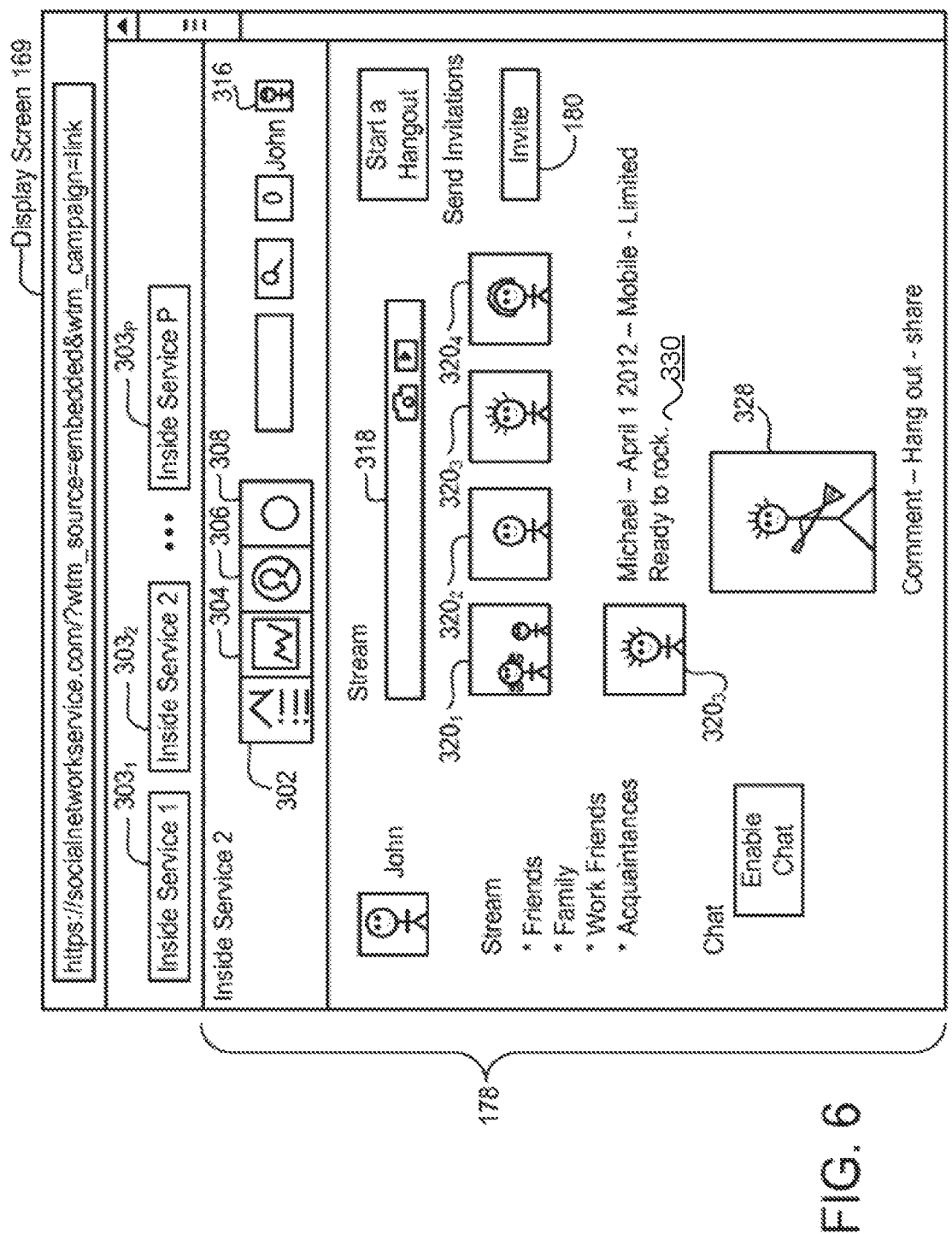
FIG. 6 is a diagram of a display screen that includes an invite button within a social network service, in accordance with several implementations of the disclosure.

FIG. 6 is a diagram of the display screen 169 that includes an invite button 180 within a social network service, which is an example of the inside service 2, in accordance with various implementations of the present disclosure. The GPU of the client device 1 requests a web page 178 when the user 154₁ (FIG. 1) logs into the inside web account 1 and accesses the inside service 2. For example, after logging into the inside web account 1, the user 154₁ selects via the input device of the client device 1 a button 303₂ that allows access to the inside service 2. The NIC of the client device 1 sends an indication of the selection of the button 303₂ via the network 190 to the NIC 280 (FIG. 1). Upon receiving the indication of the selection of the button 303₂, the NIC 280 sends web page data corresponding to the web page 178 via network 190 to the NIC of the client device 1. The GPU of the client device 1 renders the web page data corresponding to the web page 178 to display the web page 178. Similarly, the remaining inside services 1 and 3 thru N are accessed by the user 154₁ by logging into the inside web account 156₁ (FIG. 1).

The web page 178 includes a home button 302, a stream button 304, a profile button 306, and a social group button 308. When a selection of the home button 302 is received, the web page 178 is displayed on the display screen 169. The web page 178 includes posts that include multimedia that is posted within web accounts of users that the user 154₁ has within his/her social group. For example, a user within a social group of the user 154₁ has shared a post 330 and an image 328 with the user 154₁. The post 330 includes text "Ready to rock". The user 154₁ may comment on the post 330, may chat with a user that has shared the post 330, may share the post 330 with users within social groups of the user 154₁, or perform a combination thereof. Also, the web page 178 includes a date "Apr. 1, 2012" on which the post 330 was shared with the user 154₁, a medium "Mobile" used to share the post 330, and name "Michael" of a user sharing the post 330.

In various implementations, when a selection of the stream button 304 is received, posts including multimedia from users outside a social group of the user 154₁ are displayed by the GPU of the client device 1. Examples of the users outside the social group of the user $154_1$ include users that post in web accounts that the user $154_1$ has not designated to follow. For example, the processor 282 (FIG. 1) randomly identifies web accounts that the user has not designated to follow and transfers multimedia data from the web accounts into the inside web account $156_1$.

In several implementations, when the home button 302 is selected by the user $154_1$ via the input device of the client device 1, the GPU displays multimedia that is posted within web accounts of users that are unknown to the user $154_1$ in combination with multimedia that is posted within web accounts of users that are within a social group of the user $154_1$.

When the profile button 306 is selected by the user $154_1$ via the input device of the client device 1, a profile of the user $154_1$ is displayed by the GPU of the client device 1. For example, photos identifying the user $154_1$, a name of the user $154_1$, names of people that the user $154_1$ performed chats, e.g., video chats, with, posts including multimedia that is uploaded by the user $154_1$ to the inside web account $156_1$, or a combination thereof, is displayed.

Moreover, when the social group button 308 is selected by the user $154_1$ via the input device of the client device 1, one or more social groups, e.g., acquaintances, friends, work friends, family, of a combination thereof, of the user $154_1$ are displayed by the GPU of the client device 1. The user $154_1$ may edit via the input device of the client device 1 the social groups of the user $154_1$, may add web accounts to the social groups, and/or delete web accounts from the social groups.

Moreover, the web page 178 includes a name "John", which is an example of a name of the user $154_1$ and a photo 316, which is an example of a photo of the user $154_1$. Furthermore, the web page 178 includes a stream field 318. The stream field 318 allows the user $154_1$ to upload multimedia to the server 206 (FIG. 1). The web page 178 also includes images 320 of users that are within social groups of the user $154_1$.

The web page 178 includes the invite button 180, which is an example of the button 173 (FIG. 1). The user $154_1$ selects the invite button 180 via the input device of the client device 1. The invite button 180 is selected to send invitations to the remaining users $154_2$ thru $154_N$ to become members of the inside service 2.

In several implementations, the web page 178 includes more buttons that that shown in FIG. 6 or excludes one or more of the buttons that are shown in FIG. 6. For example, in several implementations, the web page 178 includes a "Share" button. When the "Share" button is selected by the user $154_1$ via the input device of the client device 1, an indication of the selection is sent by the NIC of the client device 1 via the network 190 to the NIC 280. Upon receiving the indication of the selection of the "Share" button, the processor 282 generates web page data that is sent via the network 190 to the NIC of the client device 1. In response to receiving the web page data, the GPU of the client device 1 renders the web page data to generate a web page that allows the user $154_1$ to share multimedia with users within a social group of the user $154_1$ or any other user that the user $154_1$ identifies with the user data. Moreover, in various implementations, the web page 178 includes any number of images of users, any number of posts from users, or a combination thereof.

Figure 7:
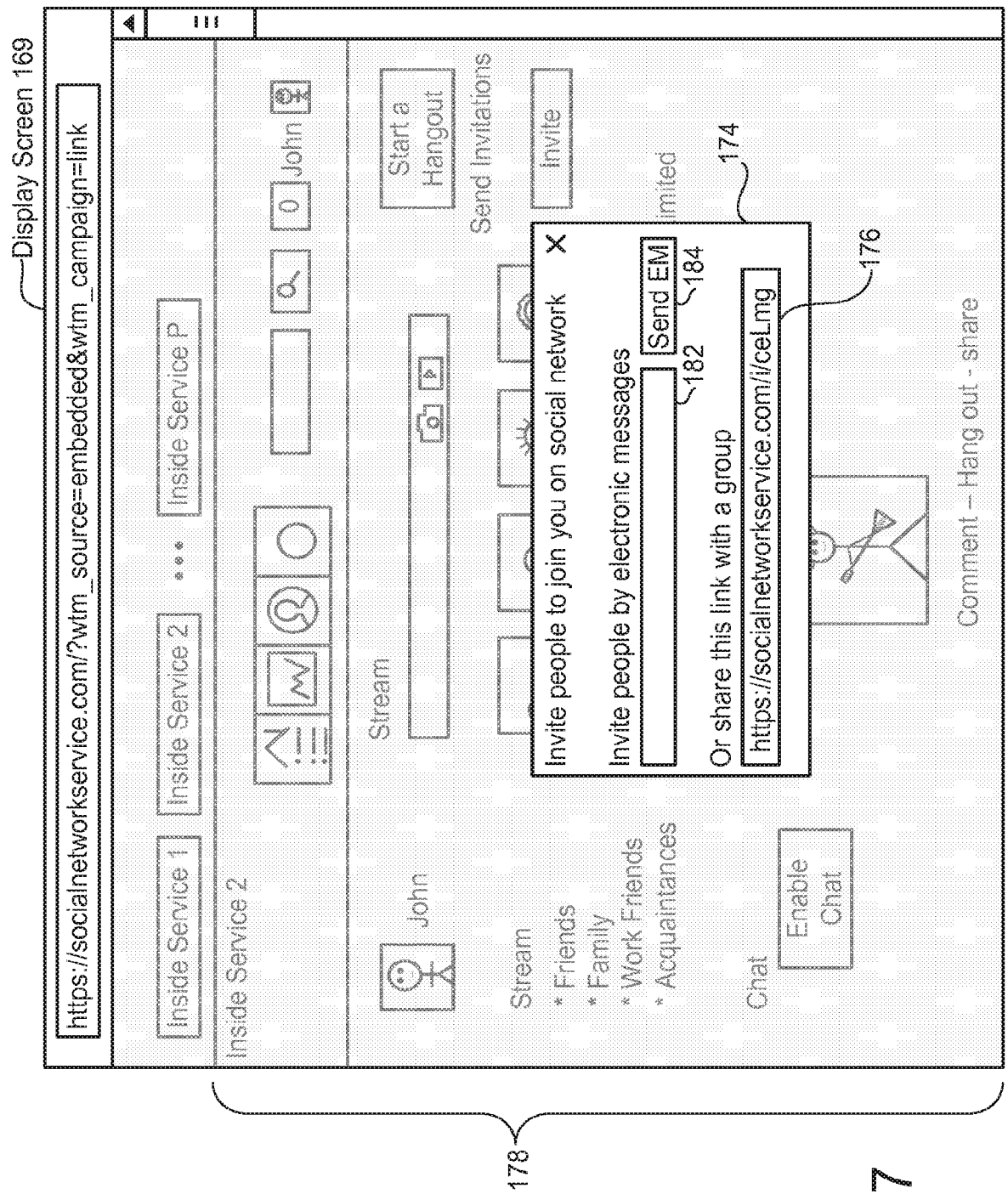
FIG. 7 is a diagram of the display screen that displays a prompt when the invite button is selected, in accordance with various implementations of the present disclosure.

FIG. 7 is a diagram of the display screen 169 that displays a prompt 174 when the invite button 180 is selected, in accordance with a variety of implementations of the present disclosure. The prompt 174 is an example of the prompt 167 (FIG. 1) and is displayed on the web page 178. In several implementations, any portion of the web page 178 except for the prompt 174 is grayed out or displayed in a lighter color than that of the prompt 174. The prompt 174 includes a text input field 182 and another text input field 176.

The user $154_1$ uses the input device of the client device 1 to provide electronic message addresses of the remaining users $154_2$ thru $154_N$ within the text input field 182. For example, the users $154_1$ provides electronic message addresses of the remaining users $154_2$ thru $154_N$ and the electronic message addresses are separated by a separator, e.g., a comma or a semicolon. In various implementations, a different text input field for each electronic message address is provided within the prompt 174 and the user $154_1$ uses the input device of the client device 1 to provide the electronic messages addresses of the remaining users $154_2$ thru $154_N$ in the different text input fields.

After providing the electronic messages addresses of the remaining users $154_2$ thru $154_N$, the user $154_1$ selects via the input device of the client device 1 a send electronic message (EM) button 184. Upon receiving an indication of the selection of the send EM button 184, the NIC of the client device 1 sends via the network 190 the URL to the one or more of the inside web accounts $156_2$ thru $156_N$, one or more of the outside web accounts $292_2$ thru $292_N$, one or more of the outside web accounts $296_2$ thru $296_N$, or a combination thereof, that are assigned to the remaining users $154_2$ thru $154_N$ and that are identified with the electronic message addresses received within the text input field 182. It should be noted that one or more of the inside web accounts $156_2$ thru $156_N$, one or more of the outside web accounts $292_2$ thru $292_N$, one or more of the outside web accounts $296_2$ thru $296_N$, or a combination thereof, that are identified with the electronic message addresses are referred to herein as a web account collection. In several implementations, in addition to the URL, a message indicating that the user $154_1$ would like a remaining user to join the inside service 2 is sent with the URL to the web account collection.

In various implementations, the prompt 174 includes a text input field 176 that includes the URL, such as for example, "https://socialnetworkservice.com/i/ceLmg". The user $154_1$ uses the input device of the client device to copy the URL from the text input field 176. When the user $154_1$ is using one or more of the inside services 1 and 3 thru P, one or more of the outside services $293_1$ thru $293_P$, one or more of the outside services $295_1$ thru $295_P$, or a combination thereof, to communicate with one or more of the remaining users $154_2$ thru $154_P$, the user $154_1$ pastes via the input device of the client device 1 the URL within the service used.

Figure 8:
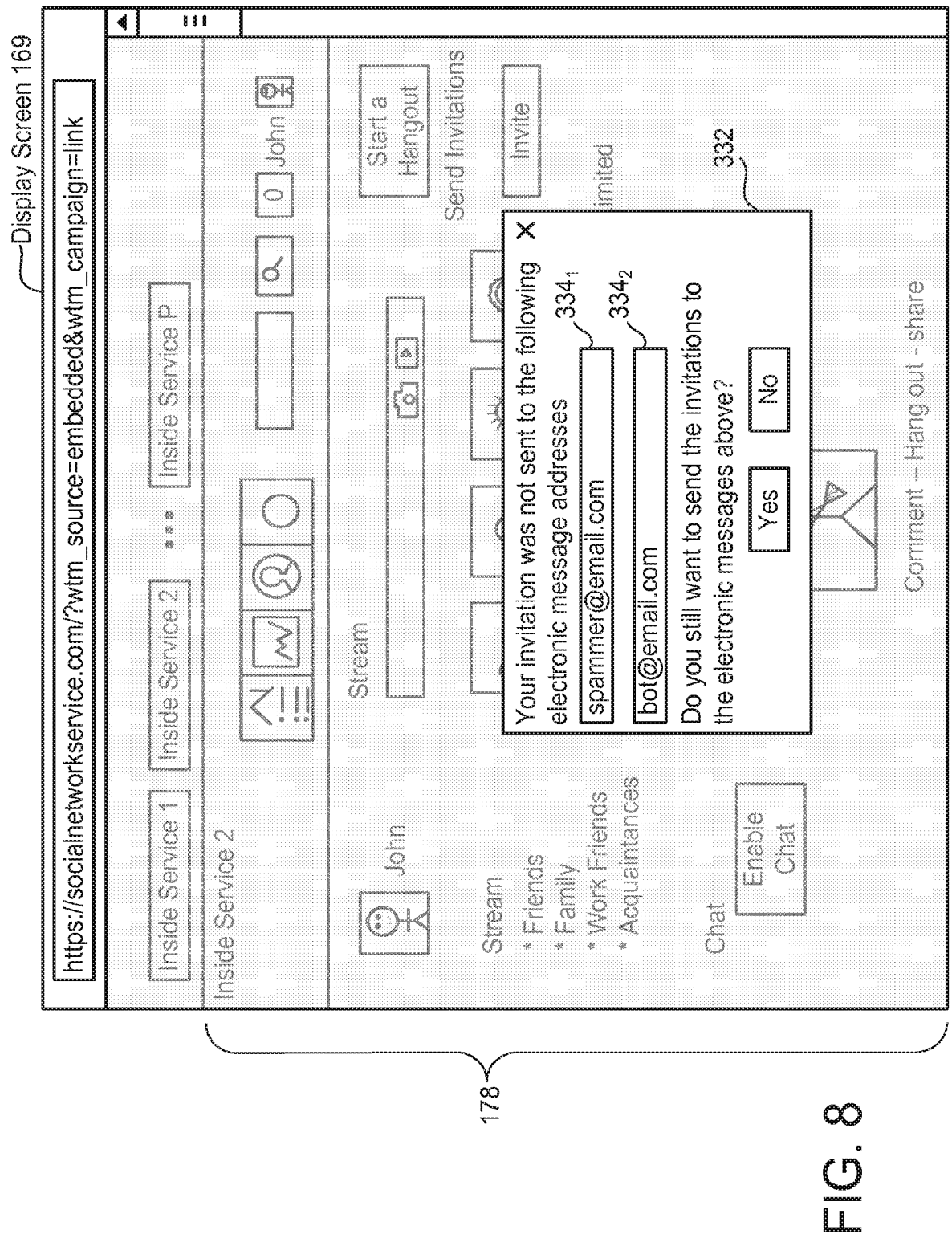
FIG. 8 is a diagram of the display screen that includes a caution that is displayed when a user selects a send electronic message button on the display screen, in accordance with several implementations of the present disclosure.

FIG. 8 is a diagram of the display screen 169 that includes a caution 332 that is displayed when the user $154_1$ selects the send EM button 184 (FIG. 7), in accordance with several implementations of the present disclosure. The NIC of the client device 1 sends an indication of the selection of the send EM button 184 to the NIC 280 via the network 190 (FIG. 1).

Upon receiving the indication of the selection of the send EM button 184 from the NIC 280, the processor 282 generates the caution data 165 (FIG. 1) and the caution data 165 is sent via the NIC 280 and the network 190 to the NIC of the client device 1. For example, the processor 282 determines parameters associated with use of one or more of the inside web accounts $156_1$, $156_3$ thru $156_N$, one or more of the outside web accounts $292_1$ thru $292_N$, one or more of the outside web accounts $296_1$ thru $296_N$, or a combination thereof, that are identified with the electronic message addresses received within the text input field 182 or within different text input fields of the prompt 174 (FIG. 7).

Examples of the parameters include usage of posts within the web account collection, a change over time in user data within social groups that are accessed with the web account collection, one or more keywords used within the web account collection, a frequency of use of the web account collection, a frequency of use of the keywords, an amount of delay between sending the invitations from the client device 1 or the server 206 and receiving the notification data 188 from the server 206, or a combination thereof.

Based on the parameters, the processor 282 restricts sending the URL within an electronic message to the web account collection. For example, upon determining that the usage of posts within the web account collection is lower than a first threshold, a change over time in user data within social groups that are accessed with the web account collection is lower than a second threshold, one or more keywords used within the web account collection meet a third threshold, a frequency of use of the web account collection is lower than a fourth threshold, a frequency of use of the keywords is lower than a fifth threshold, an amount of delay between sending the invitations from the client device 1 or the server 206 to the web account collection and receiving the notification data 188 from the web account collection is lower than a sixth threshold, or a combination thereof, the processor 282 does not allow to send the URL within an electronic message to the web account collection. In this example, the web account collection includes web accounts of spammers, bots, or a combination thereof. The one or more keywords used within the web account collection meet the third threshold when there is a match between the one or more keywords and one or more keywords of the third threshold.

In this example, on the other hand, upon determining that the usage of posts within the web account collection is equal to or greater than the first threshold, a change over time in user data within social groups that are accessed with the web account collection is equal to or greater than the second threshold, one or more keywords used within the web account collection do not meet the third threshold, a frequency of use of the web account collection is equal to or greater than the fourth threshold, a frequency of use of the keywords is equal to or greater than the fifth threshold, an amount of delay between sending the invitations from the client device 1 or the server 206 to the web account collection and receiving the notification data 188 from the web account collection is equal to or greater than the sixth threshold, or a combination thereof, the processor 282 allows sending the URL within an electronic message to the web account collection.

Upon restricting sending the URL within one or more electronic messages to the web account collection based on the parameters, the processor 282 generates the caution data 165 and the NIC 280 sends the caution data 165 via the network 190 to the client device 1.

In several implementations, the caution data 165 is generated as soon as each electronic message address is received within the text input field 182 (FIG. 7) or within a different text input field of the prompt 174 (FIG. 7). For example, a first portion of the caution data 165 is generated after receiving an electronic message address within the text input field 182 and before receiving another electronic message address within the text input field 182 or within a different text input field of the prompt 174.

The GPU of the client device 1 renders the caution data 165 to display the caution 332 on the display screen 169 (FIG. 1). The caution 332 includes fields 334 that include electronic message addresses of the remaining users 154$_2$ thru 154$_N$ for whom the processor 282 determined to restrict sending the URL. In various implementations, the caution 332 includes any number of fields that is different than that shown in FIG. 8.

In various implementations, the caution 332 includes an option that indicates to the user 154$_1$ whether the user 154$_1$ wishes to send the invitations to the web account collection. When the user 154$_1$ selects via the input device of the client device 1 a "Yes" button that is displayed within the prompt 322, an indication of the selection is sent by the NIC of the client device 1 via the network 190 to the NIC 280. Upon receiving the indication of the selection of the "Yes" button, the processor 280 sends the URL to the web account collection. On the other hand, when the user 154$_1$ selects via the input device of the client device 1 a "No" button that is displayed within the prompt 322, an indication of the selection is sent by the NIC of the client device 1 via the network 190 to the NIC 280. Upon receiving the indication of the selection of the "No" button, the processor 280 does not send the URL to the web account collection.

In several implementations, the processor 282 does not provide the option to the user 154$_1$ of selecting the "Yes" or "No" buttons. Rather, in these implementations, the processor 282 restricts sending the URL to the web account collection.

Figure 9:
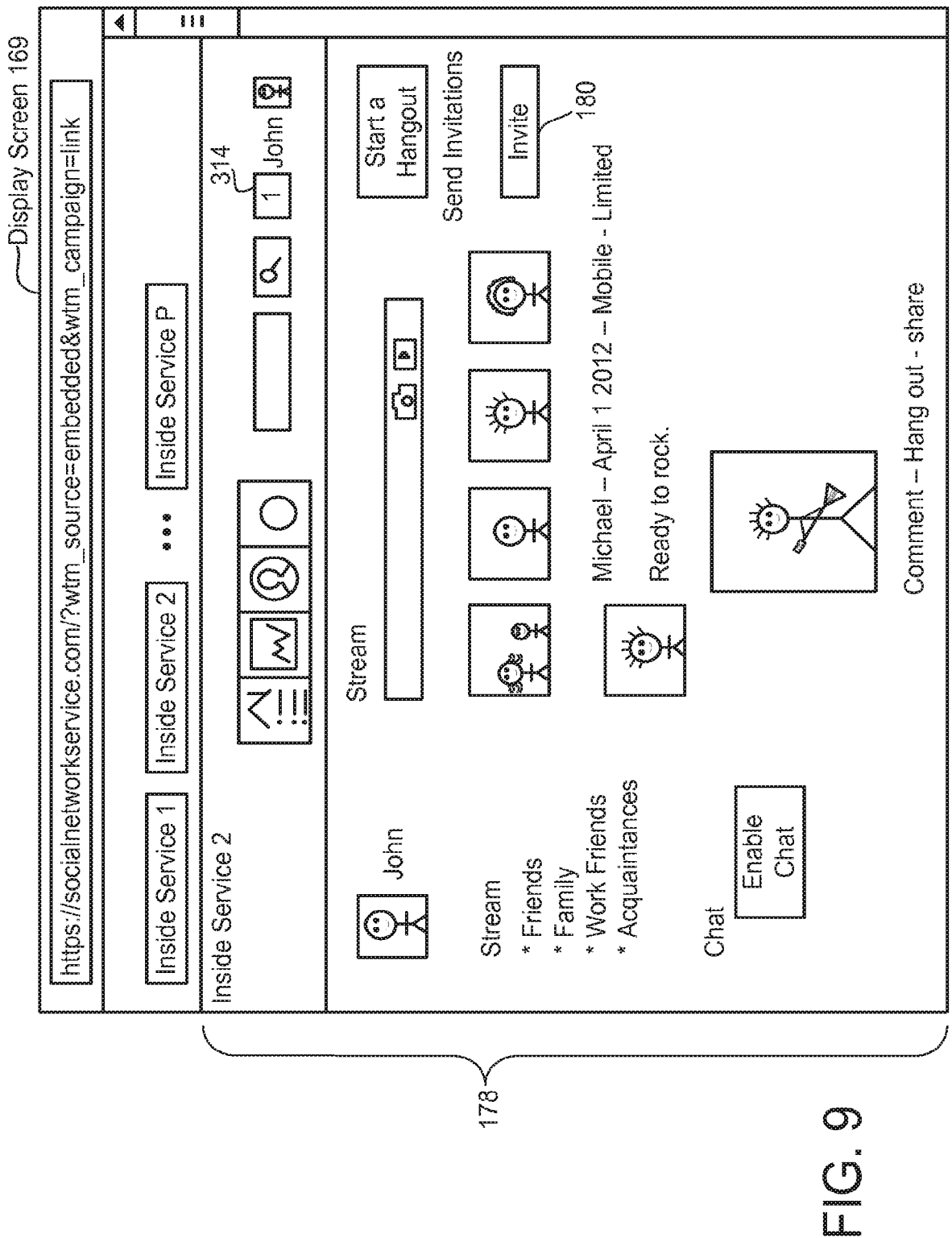
FIG. 9 is a diagram of the display screen that includes a notification that is displayed when remaining users become members of an inside service, in accordance with various implementations of the present disclosure.

FIG. 9 is a diagram of the display screen 169 that includes a notification 314 that is displayed when the remaining users 154$_2$ thru 154$_N$ become members of the inside service 2, in accordance with several implementations of the present disclosure. The notification 314 is an example of the notification 170 (FIG. 1) that is generated when the remaining users 154$_2$ thru 154$_N$ become members of the inside service 2.

In several implementations, the notification 314 is displayed within the web page 178. In various implementations, the notification 314 is displayed within one or more of the inside services 1 thru P. In several implementations, the notification 314 is displayed within a widget that is displayed on the display screen 169.

Figure 10:
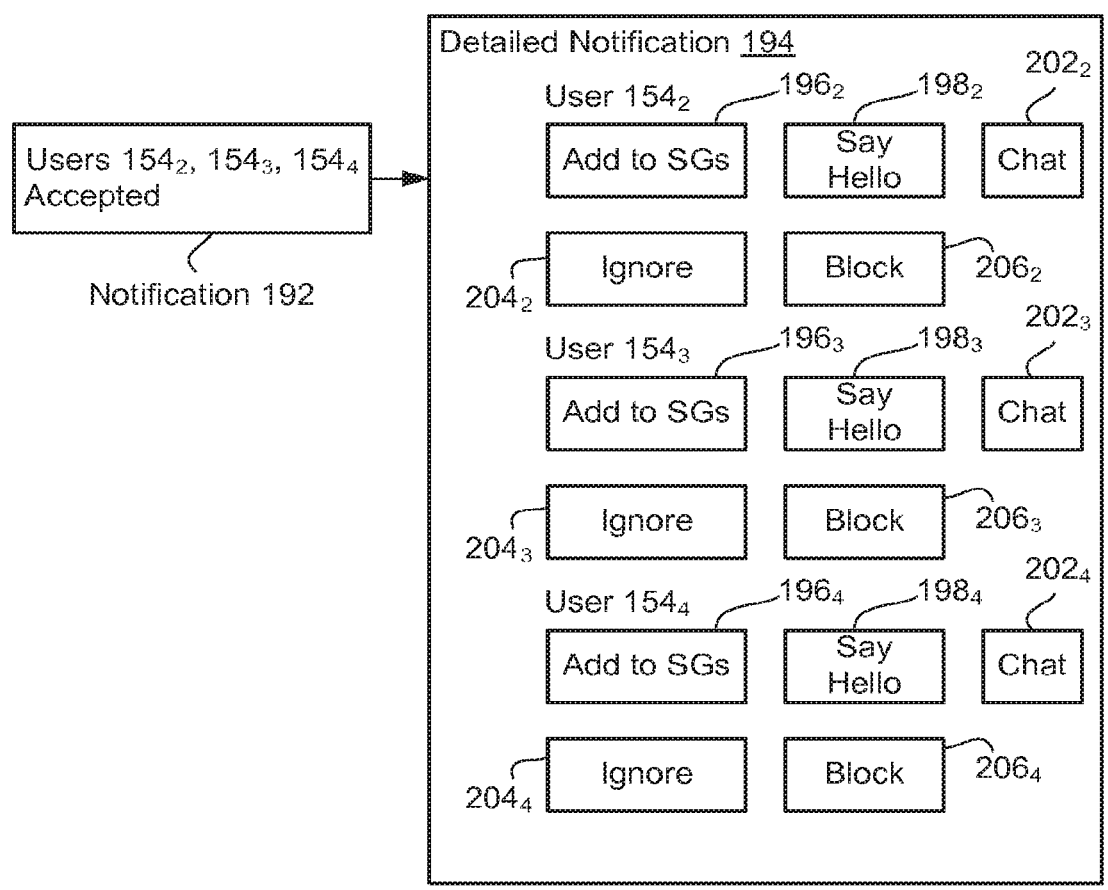
FIG. 10 is a diagram of a notification that is displayed on the display screen, in accordance with several implementations of the present disclosure.

FIG. 10 is a diagram of a notification 192 that is displayed on the display screen 169 (FIG. 1). The notification 192 is an example of the notification 170 (FIG. 1) that is generated when the remaining users 154$_2$ thru 154$_N$ become members of the inside service 2.

In several implementations, the notification 192 is displayed when the user 154 selects the notification 314 (FIG. 9) via the input device of the client device 1. For example, the notification data 188 is rendered by the GPU of the client device 1 to display both the notifications 314 and 192. In this example, a portion of the notification data 188 is rendered to display the notification 314 and the remaining portion of the notification 188 is rendered to display the notification 192. As another example, the notification 192 is displayed as a pop down menu when the user 154$_1$ selects the notification 314. When an indication of the selection of the notification 314 is received by the GPU of the client device 1, the GPU renders the notification 192.

The notification 192 indicates to the user 154$_1$ that the users 154$_2$, 154$_3$, and 154$_4$ became members of the inside service 2. In several implementations, the notification 192 also indicates to the user 154$_1$ any of the remaining users 154$_2$ thru 154$_N$ that declined to become members of the inside service 2. For example, one or more of the users 154$_2$ thru 154$_N$ may decide to not accept the invitations to become members of the inside service 2. In this example, the notification 192 includes user data of the one or more of the users $154_2$ thru $154_N$ that decided to not accept the invitations.

When the user $154_1$ selects the notification 192 via the input device of the client device 1, the GPU of the client device 1 displays a detailed notification 194. The detailed notification 194 is an example of the detailed notification 290 (FIG. 1). In several implementations, instead of the notification data 188 (FIG. 1), the detailed notification data 190 is generated and instead of the notification 192, the detailed notification 194 is displayed.

The detailed notification 194 includes user data regarding the users $154_2$, $154_3$, and $154_4$ that have become members of the inside service 2. In several implementations, the detailed notification 194 includes user data regarding a different number of users than that shown in FIG. 10.

Moreover, the detailed notification 194 includes an "Add to SGs" button $196_2$, where SG is an acronym for social group. When the user $154_1$ selects the button $196_2$, the processor 282 (FIG. 1) adds the inside web account $156_2$ of the user $154_2$ to a social group of the user $154_1$. For example, when the user $154_1$ selects the "Add to SGs" button $196_2$, the processor 282 generates social group web page data and the NIC 280 (FIG. 1) sends the social group web page data via the network 190 to the client device 1. The GPU of the client device 1 renders the social group web page data to display a social group web page, which is illustrated below in FIG. 14. The social group web page includes one or more social groups of the user $154_1$. The user $154_1$ may add the inside web account $156_2$ of the user $154_2$ to one or more of the social groups of the user $154_1$.

The detailed notification 194 also includes a "Say Hello" button $198_2$. When the "Say Hello" button 1982 is selected by the user $154_1$ via the input device of the client device 1, the processor 282 generates greeting message data that is stored within the inside web account $156_2$ of the user $154_2$. When the user $154_2$ accesses the inside web account $156_2$ via the client device 2 and further accesses the inside service 2, a GPU of the client device 2 renders the greeting message data to display a welcome greeting within the inside service 2 on a display screen of the client device 2.

The detailed notification 194 includes a "Chat" button 2022. When the "Chat" button $202_2$ is selected by the user $154_1$ via the input device of the client device 1, the processor 282 initiates a chat session, such as for example, a video chat session, a text chat session, a voice chat session, or a combination thereof, with the user $154_2$ via the inside web accounts $156_1$ and $156_2$ of the users $154_1$ and $154_2$.

The detailed notification 194 includes an "Ignore" button $204_2$. When the "Ignore" button $204_2$ is selected by the user $154_1$ via the input device of the client device 1, the processor 282 does not allow any multimedia sent from the inside web account $156_2$ of the user $154_2$ to be received by the inside web account $156_1$ of the user $154_1$.

The detailed notification 194 includes a "Block" button 2062. When the "Block" button $206_2$ is selected by the user $154_1$ via the input device of the client device 1, the processor 282 does not allow any multimedia sent from the inside web account $156_2$ of the user $154_2$ to be received by the inside web account $156_1$ of the user $154_1$ and does not allow any multimedia sent from the inside web account $156_1$ of the user $154_1$ to be received by the inside web account $156_2$ of the user $154_2$.

Similarly, the user $154_1$ may add the user $154_3$ to one or more social groups of the user $154_1$ by selecting an "Add to SGs" button $196_3$, may greet the user $154_3$ by selecting a "Say Hello" button $198_3$, may chat with the user $154_3$ by selecting a "Chat" button $202_3$, may ignore the user $154_3$ by selecting an "Ignore" button $204_3$, and/or may block the user $154_3$ by selecting a "Block" button $206_3$. Also, the user $154_1$ may add the user $154_4$ to one or more social groups of the user $154_1$ by selecting an "Add to SGs" button $196_4$, may greet the user $154_4$ by selecting a "Say Hello" button $198_4$, may chat with the user $154_4$ by selecting a "Chat" button 2024, may ignore the user $154_4$ by selecting an "Ignore" button $204_4$, and/or may block the user $154_4$ by selecting a "Block" button $206_4$.

In several implementations, the detailed notification 194 includes any number of buttons. For example, the detailed notification 194 excludes one or more of the "Say Hello" buttons 198, the "Chat" buttons 202, the "Ignore" buttons 204, and the "Block" buttons 206. As another example, the detailed notification 194 excludes the buttons 196.

Figure 11:
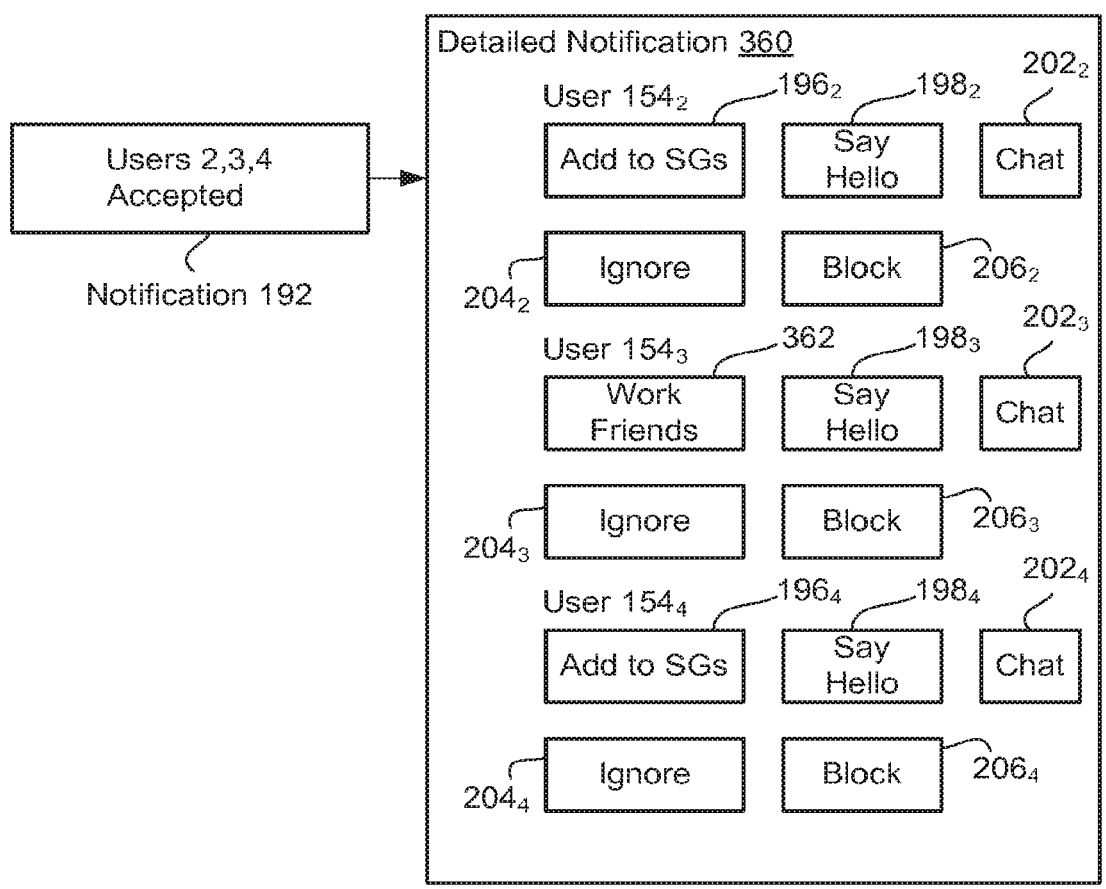
FIG. 11 is a diagram of a detailed notification that is displayed when a notification is selected by the user, in accordance with various embodiment of the present disclosure.

FIG. 11 is a diagram of a detailed notification 368 that is displayed when the notification 192 is selected by the user $154_1$, in accordance with several implementations of the present disclosure. When the user $154_1$ selects the notification 192 via the input device of the client device 1, the GPU of the client device 1 displays the detailed notification 368. The detailed notification 368 is an example of the detailed notification 290 (FIG. 1). In several implementations, instead of the notification data 188 (FIG. 1), the detailed notification data 190 is generated and instead of the notification 192, the detailed notification 368 is displayed.

The detailed notification 368 is similar to the detailed notification 194 (FIG. 10) except that instead of the "Add to SGs" button $196_3$, the detailed notification 368 includes a "Work Friends" button 362 that indicates to the user $154_1$ that the inside web account $156_3$ of the user $154_3$ is within a "Work Friend" social group of the user $154_1$. When the user $154_1$ selects the "Work Friends" button 362, the processor 282 generates the social group web page data and the social group web page data is rendered by the GPU of the client device 1 for displaying a social group web page on the display screen 169. The user $154_3$ is added to the "Work Friends" social group of the user $154_1$ between a time the user $154_3$ becomes a member of the inside service 2 and a time the detailed notification 360 is displayed. In several implementations, instead of or in addition to the "Work Friends" social group, the detailed notification 260 indicates that the user $154_3$ is within one or more of other social groups of the user $154_1$.

Figure 12:
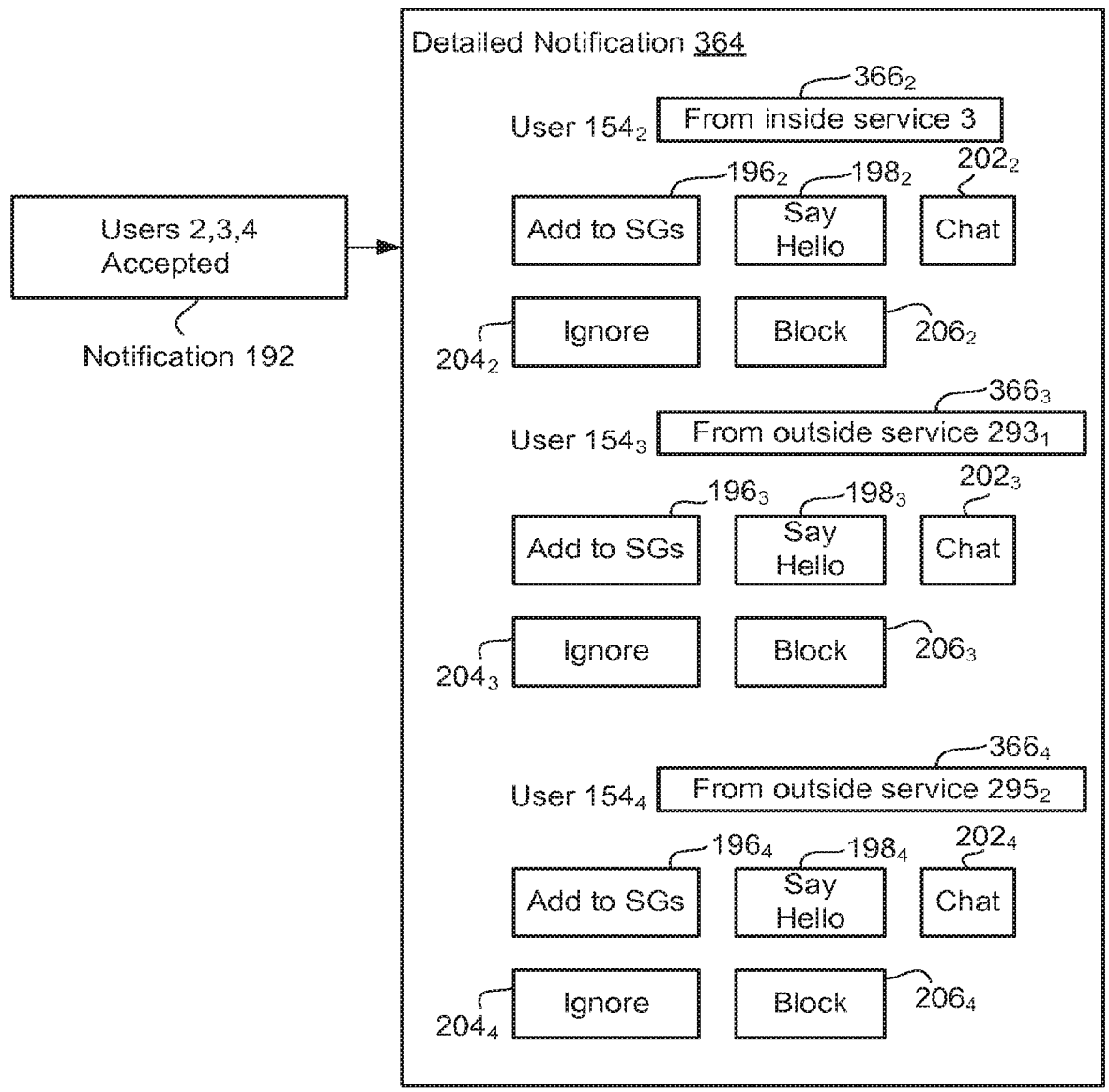
FIG. 12 is a diagram of a detailed notification that is displayed when the notification is selected by the user, in accordance with several implementations of the present disclosure.

FIG. 12 is a diagram of a detailed notification 364 that is displayed when the notification 192 is selected by the user $154_1$, in accordance with various implementations of the present disclosure. When the user $154_1$ selects the notification 192 via the input device of the client device 1, the GPU of the client device 1 displays the detailed notification 364. The detailed notification 364 is an example of the detailed notification 290 (FIG. 1). In several implementations, instead of the notification data 188 (FIG. 1), the detailed notification data 190 is generated and instead of the notification 192, the detailed notification 364 is displayed.

The detailed notification is similar to the detailed notification 194 (FIG. 10) except that the detailed notification 364 identifies a service, e.g., one of inside services 1, 3 thru P, outside services $293_1$ thru $293_P$, and outside services $295_1$ thru $295_P$, that the remaining users $154_2$ thru $154_4$ used to access the URL. For example, the user $154_2$ accessed the inside service 3 via a display screen of the client device 2 to view the URL and to select the URL. The inside service 3 is displayed within a field $366_2$. As another example, upon receiving an indication of the selection of the "Send EM" button 184 (FIG. 7), the NIC of the client device 1 sends the URL to the inside service 3 that is accessed via the inside web account 156₂ of the user 154₂. As yet another example, the user 154₃ accessed the outside service 293₁ via a display screen of the client device 3 to view the URL and to select the URL. The outside service 293₁ is displayed within a field 366₃. As another example, the user 154₄ accessed the outside service 295₂ via a display screen of the client device 4 to view the URL and to select the URL. The outside service 295₂ is displayed within a field 366₄.

It should be noted that although FIGS. 6 thru 12 are described with respect to the same display screen 169, in several implementations, one or more of the FIGS. 6 thru 12 may be described with respect to different display screens of different client devices. For example, the web page 178 of FIG. 6 is displayed on a first display screen of a first client device that is operated by the user 154₁ to access the inside web account 156₁ and the web page 178 of FIG. 7 is displayed on a second display screen of a second client device that is operated by the user 154₁ to access the inside web account 156₁.

Figure 13:
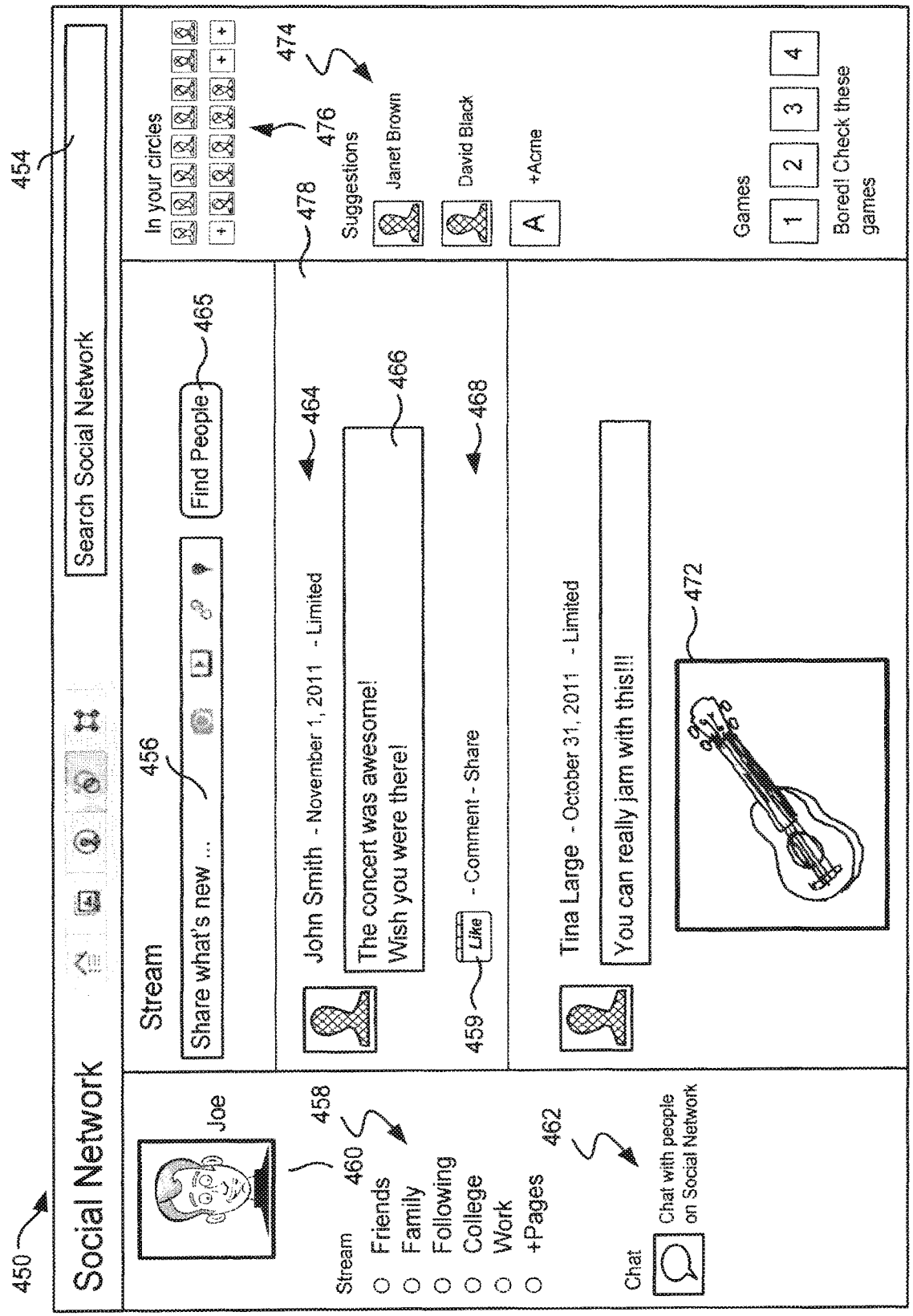
FIG. 13 is a web page for interfacing with the social network, in accordance with various implementations of the present disclosure.

FIG. 13 shows a web page 450 for interfacing with the social network, in accordance with several implementations of the present disclosure. For example, Joe, who is an example of the user 154₁, is shown logged into the inside web account 156₁, a portion of which is represented by a web page 450. In several implementations, the social network is created when the inside service 2 is provided to more than one user. In various implementations, posts received by Joe are referred to as content of a stream in the social network. The web page 450 is an example snapshot of a page for viewing Joe's stream in the social network, and search field 454 is an input area for searching the social network or other content. The web page 450 is displayed on the display screen 169 (FIG. 1).

In several implementations, the stream is presented in a middle panel of the web page 450. Input box 456 allows Joe to add new posts in the social network. When Joe enters a new post, Joe is able to select a destination for the post. The destination to which the new post is addressed could be the complete social network (e.g., a public post), to the user 154₂ after the user 154₂ becomes a member of the social network service, or to one or more social groups defined by Joe.

In various implementations, social groups defined by Joe include various graphically designed interfaces or text based lists, dialog boxes, pull downs, radio buttons, and other interfaces defined from a combination of graphical elements, text, images, pictures, combinations thereof, etc. More details regarding the creation of social groups are provided below. In several implementations, a post may be a text message, a photo, a video, a link to a web page, or a location of a user. Thus, the content and form of the post may include any data that may be presented, displayed, listened to, interfaced with, received, sent, shared, approved, or disapproved, etc. In various implementations, a post includes multimedia.

In several implementations, a stream includes posts added by a user, by others socially linked to the user, or by an entity that the user has chosen to follow (e.g., be linked with in the social network). In a number of implementations, an entity may be restricted from posting to a user's stream, unless the user has established a social link with the entity beforehand, e.g., the user has chosen to follow the entity.

In various implementations, each post may include information 464 about an author of the post, a timestamp of creation of the post, and a scope of the post (e.g., public, limited, etc.). Example post 478 may include a text message 466 entered by a person "John Smith," but other types of posts are possible, e.g., a photo 472, a video, a link, data, etc. The social network provides options 468 to Joe to respond to the post, e.g., providing an endorsement of the post, adding a comment to the post, or sharing the post with others.

As used herein, an endorsement is a public recommendation of an item, e.g., a web page, a person, a post, an entity, etc. An endorsement may also be referred to or provided as an acknowledgment, a "+1", a thumbs-up, a "√" (check) mark, a confirmation, a ratification, a validation, a seal of approval, a testimonial, support, advocacy, an approval, a ratification, etc. In a variety of implementations, a button is provided in various web pages to enable a user to provide his or her endorsement. See for example button 459. The various web pages may be pages on web accounts of the social network, on pages of third party web sites, on search pages, in lists of search results, etc. The button 459 is provided, in several implementations, as an icon that may be selected by Joe. When selected, the count associated with the button 459 is displayed, so as to provide a user with information regarding the number of other users that may have selected the button 459.

When Joe selects the endorsement button, a count associated with the item endorsed is incremented. The count associated with the item measures the popularity of the item, and as users endorse an item, the count increases. In various implementations, the action of endorsing an entity in the social network does not cause the entity to be linked with a user in the social network. In several implementations, for a link to be established in the social network between a user and an entity, a different operation is used where the user explicitly adds the entity to the user's social network. The explicit add may be performed by selection on an interface by a user, addition of an entity to one of groups, e.g., social group circles, or selection of a button, icon, or some input control by a user to follow the entity. The following of the entity may also be triggered automatically, based on a user's approval to take this action each time the user views, finds, selects, or interfaces with an account of an entity.

Button 465 gives Joe an ability to visit a web page other than web page 450. The other web page which provides an interface to identify search parameters for finding people or entities in the social network. A profile picture 460 of Joe may be provided on the left side of the web page 450. In addition, stream filtering options 458 allows Joe to limit or tune what is presented on the stream. In a number of implementations, the filtering options include radio buttons to select or deselect social groups created by Joe. In addition, the filtering options also include a radio button to enable or disable messages from entity pages in the stream. Although radio buttons are used, other types of user selectable controls may be used, e.g., drop downs, text fields, toggles, voice inputs, etc. In various implementations, a chat button 462 is provided to allow Joe to engage in conversation with others in the social network. On the right panel, icons 476 represent users in the social network that are linked via a social group with Joe. In addition, the social network provides suggested new users in an area 474. It is again noted that the layout of the features on the web page 450 is only one example, and the layout may vary based on site designer preferences.

Implementations described in the present disclosure allow a person or an entity to be in control of adding users to the social network of the person or the entity. For example, for an entity to initiate communication with a person, the person first adds explicitly the entity to his/her social network. In several implementations, an entity is not able to initiate communications in the social network with a person that has not added the entity to his/her social network, or that has not explicitly mentioned the entity in a post.

In a number of implementations, a "mention" is an explicit reference to a user in a communication. A mention allows an author of a post to grab a user's attention to a post because of the introduction of a mention identifier with, for example, a user's name. In several implementations, a mention is performed by utilizing the "+" or "@" signs followed by the name of a person or entity. It is noted that a "+" sign may be used to mention a person or an entity. When a person or an entity is mentioned within the context of the social network, the person or entity may receive a notification that he/she/it has been mentioned in a post (depending on notification settings). A user is also able to see the entirety of the post on which the user is mentioned, even if the post was not originally shared with the user.

A person is able to perform certain operations affecting the relationship between the person and an entity. A person may endorse the entity, or the person may add the entity to one of his/her social groups defined in the social network. In various implementations, the fact that a person endorses an entity does not enable the entity to freely initiate full communications or posts with the person. Of course, if a person and an entity are socially linked, the entity may initiate communications with the person and post on the person's web account.

Figure 14:
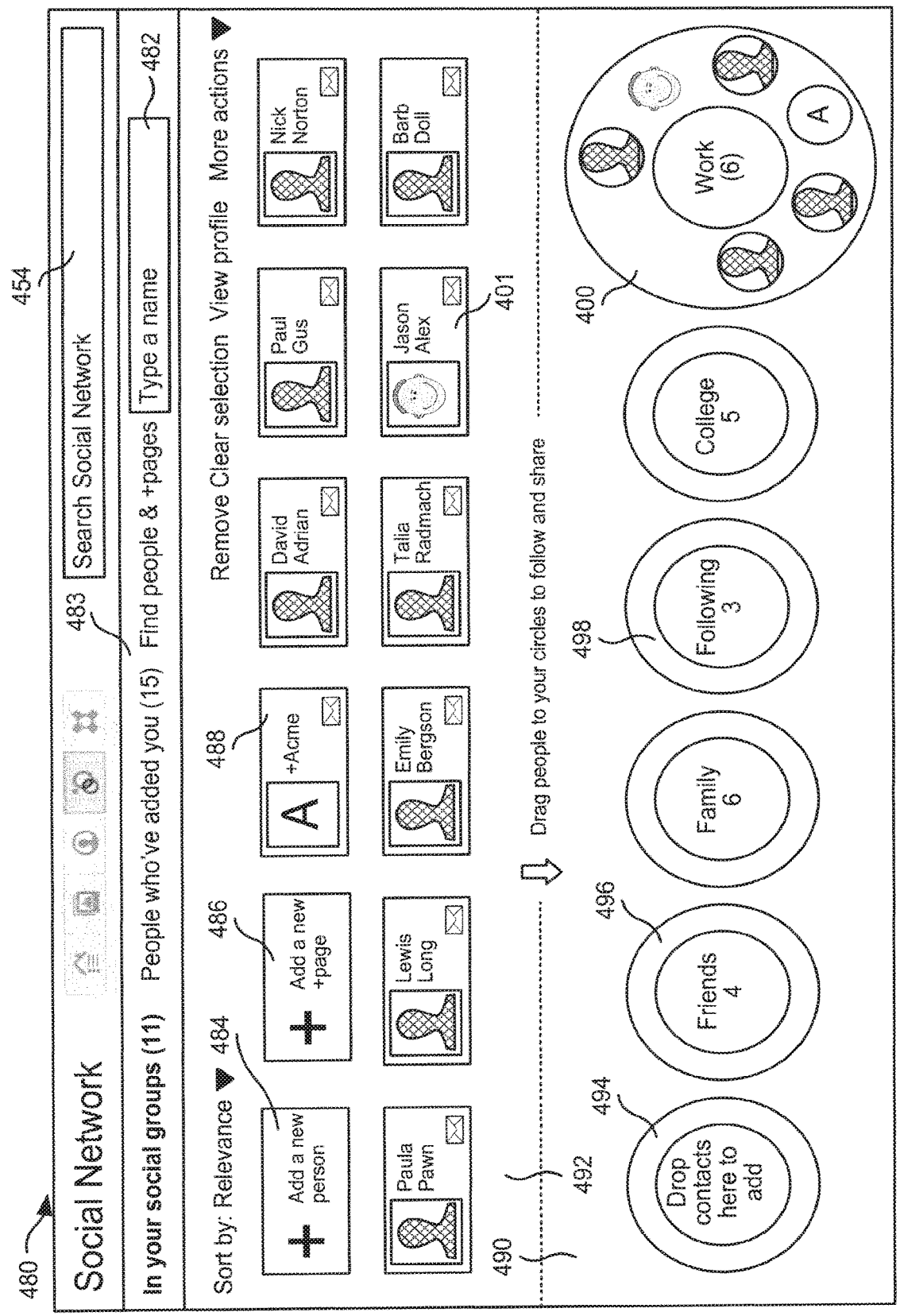
FIG. 14 shows an embodiment of a web page for managing user groups within a social network, in accordance with several implementations of the present disclosure.

FIG. 14 shows a web page 480 for managing user groups within the social network, in accordance with several implementations of the present disclosure. The web page 480 is displayed on the display screen 169 (FIG. 1). The user $154_1$ is shown logged into the inside web account $156_1$ to access a social network service, a portion of which is represented by the web page 480. A bar 483 provides selection options for choosing users, which are then displayed in users area 492. In the implementations shown in FIG. 3, the user $154_1$ has selected the option "In your social groups" to display user multimedia representing users that are currently in the user $154_1$'s social groups (e.g., user defined groups). A second option in bar 483 allows the selection of user multimedia representing users that have added the user $154_1$ to their groups in the social network. In addition, bar 483 includes an input field 482 to search for people or entities. In various implementations, the social network provides an option to follow other users anonymously. If a user follows another user anonymously, the user will be able to see the public posts of the other user, and the other user being followed would not be aware that this user is following them.

User's area 492 includes multimedia, e.g., icons, images, pictures or indicators associated with several users, and social group area 490 includes the groups defined by the user $154_1$. In several implementations, the user $154_1$ is able to add user multimedia to the social groups in social group area 490 by selecting a user icon, dragging the icon to the social group area 490, and dropping the icon in one of the social groups. In some implementations, to delete a user multimedia from a social group, the user icon inside the social group is dragged from the social group and dropped outside the social group.

In various implementations, when the user $154_1$ moves the mouse over a social group, the social group is enlarged to show user icons corresponding to the users belonging to that social group. For example, after placing the mouse over social group 400, social group 400 is expanded, having now a larger size than the other social group, and presents multimedia representing users in that social group. Other social groups, e.g., social group 496 named "Friends," are presented in a smaller size than social group 400 and do not show their contents. To create a new social group, the user $154_1$ may drop a user multimedia from users' area 492 in social group 494.

In several implementations, the social network creates a default social group for inclusion of multimedia that represents an entity. The implementations of FIG. 14 provide a social group 498 named "Following" for inclusion of entity multimedia. The entity multimedia does not have to be added to social group 498, and may be added to any of the social groups defined by the user $154_1$. In various implementations, persons and entities may also be added to more than one social group. In several implementations, when a user starts following an entity, the entity multimedia is automatically added to the "Following" social group, although the user may later remove the entity multimedia or move the entity multimedia to another social group. In a variety of implementations, when the decision is made to follow an entity, a drop down provides a user with options to add the entity multimedia to any one of the social groups previously created by the user or to a "Following" social group. This option allows for direct adding of user multimedia to social groups, without first adding the user multimedia to the "Following" social group 498.

User multimedia in user area 492 is multimedia representing real persons (e.g., person 401 "Jason Alex") and/or is multimedia representing entities (e.g., entity 488 "+Acme"). Users are able to place real persons or entities in any of the social groups, and a social group may have multimedia representations of people, multimedia representations of entities, or a mix of multimedia representations of people and multimedia representations of entities.

In several implementations, user area 492 also includes a couple of selection boxes for adding persons 484 or entities (e.g., +pages) 486. When the user $154_1$ selects one of these boxes, options are presented to enter the name of a person or an entity, or to perform a search on the social network. In various implementations, a unique box is presented to search for people or entities. In several implementations, once the person enters a "+" sign as the first character of the search, the social network limits the search to entities. Otherwise, the search is limited to real persons. Again, it should be understood that any symbol or token, other than "+" may be used to filter, identify or modify a search query.

Figure 15:
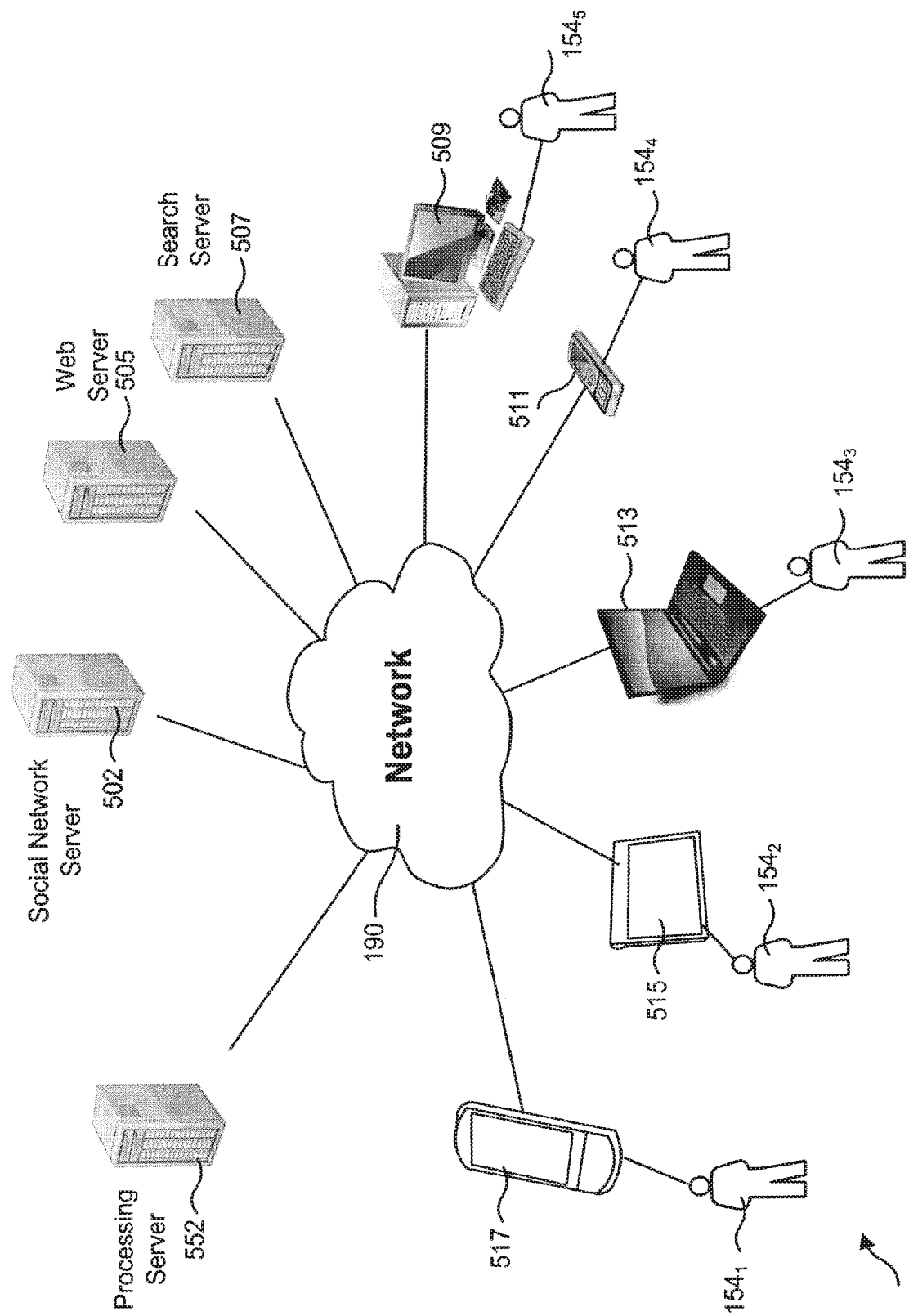
FIG. 15 is a diagram of an architecture of a system that may utilize implementations described herein, in accordance with various implementations of the present disclosure.

FIG. 15 provides an architecture of a system 550 that may utilize implementations described herein, in accordance with various implementations of the present disclosure. Users 154 interact with each other in the context of a social network, where users 154 include real people and entities. In several implementations, entities perform interactive actions similar to people, although an entity may not be an individual person. For instance, an entity may be a commercial enterprise that may wish to market goods or services. Each user $154_1$ thru $154_5$ has a web account in the social network. In several implementations, each web account includes user data, e.g., a user name of a user and/or a profile of the user with additional information about the user, e.g., birth date, gender, residence, favorite activities, etc. A user is in control of what information is added to his/her/its profile, and what information is shared with others. A user may access the social network through different client devices e.g., a personal computer 509, a mobile phone 511, a laptop 513, a tablet computer 515, a smart phone 517, or any computing device that provides access to the network 190. Of course, the illustrated devices are only examples. In various implementations, one or more components of a client device are included in a server.

In several implementations, a web server 505 sends web page data in response to a web page request received from a client device. In a number of implementations, social network server 502 delivers a social network service that enables users 154 to interact with each other via the network 190. The social network provides a website that enables users 154 to define web accounts, which may be accounts for people and entity accounts. Through those web accounts, users 154 are able to connect with their friends, group of friends, entities, groups of entities, etc. In a number of implementations, the relationships established in the social network may be utilized in other contexts.

A processing server 552 manages electronic messaging between persons and non-person entities, by enforcing rules that enable or disable electronic messaging and/or actions within the social network. A search server 507 provides network search capabilities.

In various implementations, the social network provides customizable controls that people may use to manage interactions and electronic messaging with non-person entities. In one example, the inside application $284_2$ (FIG. 1) that includes logic for providing the social network may define various services, e.g., the inside service 2 (FIG. 1), and controls. One example service is designed for real person users (e.g., personal accounts). Another example service is designed for non-person entities (e.g., entity accounts). The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily via the network 190, primarily as a brick and mortar outfit, or a combination thereof.

In several implementations, the social network provides entities with a type of interface for posting electronic messages, communicating, sharing, and generally interacting within the social network. In various implementations, this interface for entities is referred to as "entity pages," indicated by a token, e.g., "+", followed by the name of the entity in the social network. Real-persons have "person pages," which are different from entity pages and have different functionality, although some features are common to both entity pages and person pages. Although the symbol "+" is referred to herein as denoting a type of site or place within the social network, it should be appreciated that any symbol, identifier, word, or character may be used to define or identify the social services. In some implementations, the services may be provided without the use of any special symbols or denoted nomenclature. Thus, so long as the social network site provides the functionality defined herein, the nomenclature utilized to denote the services may take on any form, format or identifier.

Several implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 15 should therefore not be interpreted to be exclusive or limiting.

Figure 16:
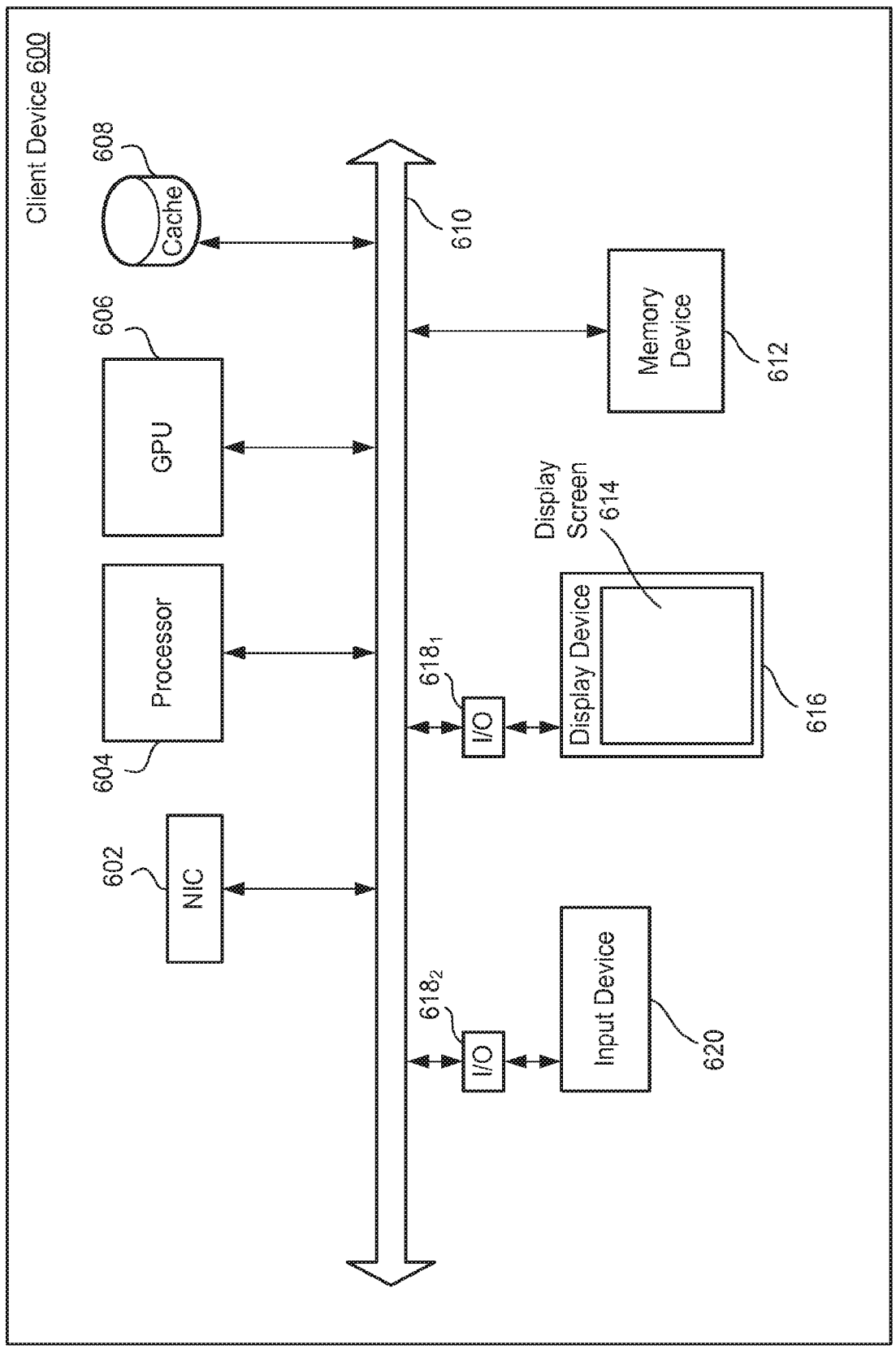
FIG. 16 is a block diagram of a client device, in accordance with several implementations of the present disclosure.

FIG. 16 is a block diagram of a client device 600, which is an example of any of the client device 1 thru N (FIG. 1), in accordance with several implementations of the present disclosure. The client device 600 includes a NIC 602, a processor 604, a GPU 606, a memory device 612, a cache 608, a display device 616, and an input device 620. The cache 608 is used to temporarily store data that is received from or sent to a server system, e.g., the server system $288_1$, the server system $288_2$, or the server system $288_3$ (FIG. 1).

Examples of the display device 616 include an LCD device, an LED display device, a CRT display device, and a plasma display device. The display device 616 includes a display screen 614 and is coupled with a bus 610 via an input/output interface (I/O) $618_1$. The display screen 614 is an example of the display screen 169 (FIG. 1).

An I/O provides compatibility between the bus 610 and a device that are coupled with the I/O. For example, the I/O $618_1$ converts a rate of transfer of data on bus 610 to a rate of transfer of data of display device 616. As another example, an I/O converts a protocol used by one device coupled with the I/O to a protocol that is used by the bus 610 that is coupled with the I/O.

In some implementations, the input device 620 is integrated within the display screen 614. For example, in such implementations, the input device 620 is a touch screen. The input device 620 is coupled with the bus 610 via an I/O $618_2$.

Examples of the NIC 602 include a network interface card and a network adapter. The NIC 602 communicates with the server systems 288 via the network 190 (FIG. 1).

It should be noted that in other implementations, the client device 600 includes any number of processors, memory devices, input devices, display devices, caches, NICs and GPUs. Moreover, in some implementations, all functions that are performed by the GPU 606 are performed by the processor 604.

Implementations described in the present disclosure may be fabricated as computer-readable code on a non-transitory computer-readable storage medium, which is a storage device or a memory device. The non-transitory computer-readable storage medium holds data which may be read by a computer system. Examples of the non-transitory computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The non-transitory computer-readable storage medium may be distributed over a network-coupled computer system so that the computer-readable code is stored and executed in a distributed fashion.

Although the method operations were described in a specific order in the flowcharts of FIGS. 2 thru 5, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Implementations presented herein recite a device or apparatus. The apparatus is specially constructed for a purpose. The apparatus includes a processor capable of executing the program instructions of the computer programs presented herein.

Although the foregoing implementations have been described with a certain level of detail for purposes of clarity, it is noted that certain changes and modifications may be practiced within the scope of the appended claims. Accordingly, the provided implementations are to be considered illustrative and not restrictive, not limited by the details presented herein, and may be modified within the scope and equivalents of the appended claims.

The invention claimed is:

1. A method comprising:
   receiving, by a processor, user input of a user of a first plurality of users of a first service to transmit an invitation to a second plurality of users to become members of the first service having a first plurality of online accounts, wherein the first plurality of users are associated with respective online accounts of the first plurality of online accounts, the second plurality of users are specified in the user input and are associated with respective online accounts of a second plurality of online accounts of a second service;
   in response to the user input of the user of the first plurality of users of the first service to transmit the invitation to the second plurality of users to become a member of the first service, automatically performing a set of operations comprising:
      determining that a set of usage parameters of a subset of the second plurality of online accounts of the second service do not satisfy one or more activity criteria for becoming a member of the first service;
      preventing transmission of the invitation to become a member of the first service to a subset of users of the second plurality of users of the second service, wherein the subset of users of the second plurality of users of the second service correspond to the subset of the second plurality of online accounts of the second service that do not satisfy the one or more activity criteria; and
      sending the invitation to become a member of the first service to remaining users in the second plurality of users;
   in response to one or more users of the remaining users accepting the invitation to become members of the first service, providing notification data to inform the user that the one or more users of the remaining users have become members of the first service; and
   in response to a selection of the notification data by the user, providing a user interface presenting customized operations to be performed by the user with respect to each of the one or more users of the remaining users that have become members of the first service.

2. The method of claim 1, further comprising:
   determining whether the remaining users have received the invitation to become members of the first service.

3. The method of claim 2, wherein determining whether the remaining users have received the invitation to become members of the first service comprises:
   determining whether an indication including authentication data or profile data associated with a respective remaining user users is received, wherein the authentication data is used to assign an account to the respective remaining user, and the profile data is used to identify the respective remaining user within a computer network.

4. The method of claim 1, wherein the notification data includes widget data, the widget data including user data that identifies the users.

5. The method of claim 1, wherein the customized operations comprise one or more of:
   prompting the user to add a respective remaining user to a group maintained by the first service;
   greeting the respective remaining user;
   sharing multimedia with the respective remaining user;
   inviting the respective remaining user to chat;
   ignoring messages received from the respective remaining user; or
   blocking messages received from the respective remaining user.

6. The method of claim 1 further comprising:
   determining a usage parameter for each of the second plurality of online accounts of the second service, the usage parameter indicating activity of a respective online account for the second service.

7. The method of claim 1 further comprising:
   sending a notification over a network to inform the user of the first plurality of users of the first service that the invitation to become a member of the first service was not transmitted to the subset of users of the second plurality of users of the second service.

8. The method of claim 1, wherein the first service is a first social network and the second service is a second social network.

9. A system comprising:
   a memory; and
   a processor, coupled to the memory, to:
   receive user input of a user of a first plurality of users of a first service to transmit an invitation to a second plurality of users to become members of the first service having a first plurality of online accounts, wherein the first plurality of users are associated with respective online accounts of the first plurality of online accounts, the second plurality of users are specified in the user input and are associated with respective online accounts of a second plurality of online accounts of a second service;
   in response to the user input of the user of the first plurality of users of the first service to transmit the invitation to the second plurality of users to become a member of the first service, automatically perform a set of operations comprising:
      determining that a set of usage parameters of a subset of the second plurality of online accounts of the second service do not satisfy one or more activity criteria for becoming a member of the first service;
      preventing transmission of the invitation to become a member of the first service to a subset of users of the second plurality of users of the second service, wherein the subset of users of the second plurality of users of the second service correspond to the subset of the second plurality of online accounts of the second service that do not satisfy the one or more activity criteria; and
      sending the invitation to become a member of the first service to remaining users in the second plurality of users;
   in response to one or more users of the remaining users accepting the invitation to become members of the first service, provide notification data to inform the user that the one or more users of the remaining users have become members of the first service; and
   in response to a selection of the notification data by the user, provide a user interface presenting customized operations to be performed by the user with respect to each of the one or more users of the remaining users that have become members of the first service.

10. The system of claim 9, wherein the processor is further to:
determine whether the remaining users have received the invitation to become members of the first service.

11. The system of claim 10, wherein to determine whether the remaining users have received the invitation to become members of the first service, the processor is to:
determine whether an indication including authentication data or profile data associated with a respective remaining user users is received, wherein the authentication data is used to assign an account to the respective remaining user, and the profile data is used to identify the respective remaining user within a computer network.

12. The system of claim 9, wherein the notification data includes widget data, the widget data including user data that identifies the users.

13. The system of claim 9, wherein the customized operations comprise one or more of:
prompting the user to add a respective remaining user to a group maintained by the first service;
greeting the respective remaining user;
sharing multimedia with the respective remaining user;
inviting the respective remaining user to chat;
ignoring messages received from the respective remaining user; or
blocking messages received from the respective remaining user.

14. The system of claim 9, wherein the processor is further to:
determine a usage parameter for each of the second plurality of online accounts of the second service, the usage parameter indicating activity of a respective online account for the second service.

15. The system of claim 9, wherein the processor is further to:
send a notification over a network to inform the user of the first plurality of users of the first service that the invitation to become a member of the first service was not transmitted to the subset of users of the second plurality of users of the second service.

16. The system of claim 9, wherein the first service is a first social network and the second service is a second social network.

17. A non-transitory computer-readable medium comprising instructions, which when executed by a processor cause the processor to perform operations comprising:
receiving user input of a user of a first plurality of users of a first service to transmit an invitation to a second plurality of users to become members of the first service having a first plurality of online accounts, wherein the first plurality of users are associated with respective online accounts of the first plurality of online accounts, the second plurality of users are specified in the user input and are associated with respective online accounts of a second plurality of online accounts of a second service;
in response to the user input of the user of the first plurality of users of the first service to transmit the invitation to the second plurality of users to become a member of the first service, automatically performing a set of operations comprising:
determining that a set of usage parameters of a subset of the second plurality of online accounts of the second service do not satisfy one or more activity criteria for becoming a member of the first service;
preventing transmission of the invitation to become a member of the first service to a subset of users of the second plurality of users of the second service, wherein the subset of users of the second plurality of users of the second service correspond to the subset of the second plurality of online accounts of the second service that do not satisfy the one or more activity criteria; and
sending the invitation to become a member of the first service to remaining users in the second plurality of users;
in response to one or more users of the remaining users accepting the invitation to become members of the first service, providing notification data to inform the user that the one or more users of the remaining users have become members of the first service; and
in response to a selection of the notification data by the user, providing a user interface presenting customized operations to be performed by the user with respect to each of the one or more users of the remaining users that have become members of the first service.

18. The non-transitory computer-readable medium of claim 17, wherein the operations further comprise:
determining whether the remaining users have received the invitation to become members of the first service.

19. The non-transitory computer-readable medium of claim 18, wherein determining whether the remaining users have received the invitation to become members of the first service comprises:
determining whether an indication including authentication data or profile data associated with a respective remaining user users is received, wherein the authentication data is used to assign an account to the respective remaining user, and the profile data is used to identify the respective remaining user within a computer network.

20. The non-transitory computer-readable medium of claim 17, wherein the customized operations comprise one or more of:
prompting the user to add a respective remaining user to a group maintained by the first service;
greeting the respective remaining user;
sharing multimedia with the respective remaining user;
inviting the respective remaining user to chat;
ignoring messages received from the respective remaining user; or
blocking messages received from the respective remaining user.

* * * * *